US010567219B2

(12) United States Patent
Hamber et al.

(10) Patent No.: US 10,567,219 B2
(45) Date of Patent: *Feb. 18, 2020

(54) BUILDING AUTOMATION SYSTEM WITH SMART COMMUNICATIONS CONTROLLER FOR BUILDING EQUIPMENT

(71) Applicant: Johnson Controls Technology Company, Auburn Hills, MI (US)

(72) Inventors: Eric W. Hamber, New Berlin, WI (US); Vivek V. Gupta, Shorewood, WI (US); Sergey A. Galchenko, Mequon, WI (US); Daniel F. Leising, New Berlin, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,260

(22) Filed: Apr. 4, 2018

(65) Prior Publication Data

US 2018/0227172 A1 Aug. 9, 2018

Related U.S. Application Data

(63) Continuation of application No. 14/735,955, filed on Jun. 10, 2015, now Pat. No. 9,960,962.

(51) Int. Cl.
*G06F 15/177* (2006.01)
*H04L 12/24* (2006.01)
(Continued)

(52) U.S. Cl.
CPC .......... *H04L 41/0803* (2013.01); *G05B 15/02* (2013.01); *H04L 12/2816* (2013.01); *H04L 12/6418* (2013.01); *H04L 41/0866* (2013.01)

(58) Field of Classification Search
None
See application file for complete search history.

(56) References Cited

U.S. PATENT DOCUMENTS 6,108,350 A 8/2000 Araujo et al.
8,055,387 B2 11/2011 McCoy et al.
(Continued)

FOREIGN PATENT DOCUMENTS

CN 104038414 A 9/2014
CN 204189009 U 3/2015
(Continued)

OTHER PUBLICATIONS

Office Action for U.S. Appl. No. 14/735,955, dated Jun. 16, 2017, 18 pages.
(Continued)

*Primary Examiner* — Brian Whipple
*Assistant Examiner* — Gregory P Tolchinsky
(74) *Attorney, Agent, or Firm* — Foley & Lardner LLP

(57) ABSTRACT

A smart communications controller for building equipment includes an equipment port and a processing circuit including a plurality of autoconfiguration objects. Each of the autoconfiguration objects corresponds to a different communications protocol and is configured to perform a protocol testing process. The protocol testing process includes sending a request message to the building equipment using the corresponding communications protocol. The request message includes a request for an equipment ID. The protocol testing process includes receiving a response message from the building equipment in response to the request message and identifying the corresponding communications protocol as being used by the building equipment in response to the response message including the requested equipment ID. The processing circuit includes an equipment controller
(Continued)

configured to use the identified communications protocol to generate protocol-specific control signals for the building equipment and operate the building equipment to affect a variable state or condition within the building.

20 Claims, 10 Drawing Sheets

(51) Int. Cl.
    *H04L 12/64*     (2006.01)
    *G05B 15/02*     (2006.01)
    *H04L 12/28*     (2006.01)

(56) References Cited

U.S. PATENT DOCUMENTS

| | | |
|---|---|---|
| 9,584,252 B1 | 2/2017 | Salyers et al. |
| 2004/0260431 A1 | 12/2004 | Keenan et al. |
| 2008/0058997 A1 | 3/2008 | Timblin |
| 2011/0288846 A1 | 11/2011 | Kihas |
| 2012/0109383 A1 | 5/2012 | Richards et al. |
| 2012/0215759 A1 | 8/2012 | McCoy et al. |
| 2013/0282196 A1 | 10/2013 | Tappeiner |
| 2014/0015638 A1* | 1/2014 | Cochran ............ G06K 19/0725 340/5.65 |
| 2014/0018940 A1* | 1/2014 | Casilli .................... G05B 15/02 700/29 |
| 2014/0050229 A1 | 2/2014 | Kon et al. |
| 2014/0343886 A1 | 11/2014 | Berinato et al. |
| 2016/0033974 A1* | 2/2016 | North ........................ G06F 1/20 700/300 |

FOREIGN PATENT DOCUMENTS

| | | |
|---|---|---|
| CN | 104540264 A | 4/2015 |
| KR | 20090003983 A | 1/2009 |
| KR | 10-2015-0005770 | 1/2015 |
| KR | 20150057708 A | 5/2015 |

OTHER PUBLICATIONS

Notice of Allowance for U.S. Appl. No. 14/735,955, dated Dec. 26, 2017, 9 pages.
Search Report for International Application No. PCT/US2016/037060, dated Oct. 19, 2016, 11 pages.
Extended European Search Report for European Application No. 16808462.2, dated Jan. 9, 2019, 7 pages.
Bright Alliance Technology, The Different Types of RFID Systems, printed on Sep. 20, 2019 from Internet address http://www.batlgroup.net/the-different-types-of-rfid-systems/, 10 pages.
Smiley, Suzanne, Active RFID vs. Passive RFID: What's the Difference?, printed on Sep. 20, 2019 at Internet address https://blog.atlasrfidstore.com/active-rfid-vs-passive-rdid, 8 pages.
Chinese Non-Final Office Action for Application No. 2019092001709570, dated Sep. 25, 2019, 26 pages.

\* cited by examiner

BUILDING AUTOMATION SYSTEM WITH SMART COMMUNICATIONS CONTROLLER FOR BUILDING EQUIPMENT

CROSS-REFERENCE TO RELATED PATENT APPLICATION

This application is a continuation of U.S. patent application Ser. No. 14/735,955 filed Jun. 10, 2015, the entire disclosure of which is incorporated by reference herein.

BACKGROUND

The present disclosure relates generally to a building automation systems (BAS). The present disclosure relates more particularly to a smart communications controller configured to control building equipment in the BAS and to automatically detect a communications protocol for the building equipment.

A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof. A BAS can include various types of building equipment (e.g., chillers, fans, valves, dampers, etc.) that operate to control conditions within a building space.

Building equipment is often configured to communicate using a particular communications protocol. The communications protocol may depend on the equipment manufacturer, equipment type, equipment model, or other attributes of the building equipment. Different sets of building equipment may use different native communications protocols. When a controller is connected to the building equipment, it may be desirable to configure the controller to communicate using the native protocol of the building equipment.

Determining the native protocol of the building equipment can be time-consuming and costly. For example, a service technician may be required to visit the building and perform a site survey to identify the communications protocols used by the building equipment. Additionally, configuring a controller to use a particular communications protocol can be non-trivial and introduces the possibility of user error. For example, conventional equipment controllers typically use multiple banks of physical DIP switches to set the controller to use a particular communications protocol. In some instances, the communications protocols used by the building equipment may change after the site survey is performed, or the results of the site survey may be incomplete or inaccurate. Any change to the communications protocol may require a physical adjustment to the DIP switches. It would be desirable to provide an equipment controller that overcomes these and other disadvantages of conventional controllers.

SUMMARY

One implementation of the present disclosure is a smart communications controller for building equipment. The smart communications controller includes an equipment port connected to the building equipment and a processing circuit including a plurality of autoconfiguration objects. Each of the autoconfiguration objects corresponds to a different communications protocol and is configured to perform a protocol testing process. The protocol testing process includes sending a request message to the building equipment using the corresponding communications protocol. The request message includes a request for an equipment ID. The protocol testing process includes receiving a response message from the building equipment in response to the request message and identifying the corresponding communications protocol as being used by the building equipment in response to the response message including the requested equipment ID. The processing circuit includes an equipment controller configured to use the identified communications protocol to generate protocol-specific control signals for the building equipment and operate the building equipment to affect a variable state or condition within the building.

In some embodiments, the plurality of autoconfiguration objects are configured to perform an equipment identification process after the communications protocol used by the building equipment is identified. The equipment identification process may use the identified communications protocol to identify the building equipment connected to the equipment port.

In some embodiments, the processing circuit further includes an equipment model manager configured to receive an identity of the building equipment from the autoconfiguration objects and to use the identity of the building equipment to select an equipment model for the building equipment.

In some embodiments, the processing circuit includes an autoconfiguration manager configured to cause the autoconfiguration objects to iteratively perform their protocol testing processes until the communications protocol used by the building equipment is identified.

In some embodiments, each of the plurality of autoconfiguration objects is configured to report a result of the protocol testing process to the autoconfiguration manager. The autoconfiguration manager may be configured to terminate a first protocol testing process performed by a first autoconfiguration object in response to the first autoconfiguration object reporting a successful result of the first protocol testing process. The autoconfiguration manager may be configured to cause a second autoconfiguration object to initiate a second protocol testing process in response to the first autoconfiguration object reporting an unsuccessful result of the first protocol testing process.

In some embodiments, the autoconfiguration manager is configured to maintain a list of the autoconfiguration objects and determine whether a currently-active autoconfiguration object is a last autoconfiguration object in the list. If the currently-active autoconfiguration object is not the last autoconfiguration object in the list, the autoconfiguration manager may cause a next autoconfiguration object in the list to initiate a next protocol testing process in response to the currently-active autoconfiguration object reporting an unsuccessful result of the protocol testing process. If the currently-active autoconfiguration object is the last autoconfiguration object in the list, the autoconfiguration manager may cause a first autoconfiguration object in the list to initiate a first protocol testing process in response to the currently-active autoconfiguration object reporting an unsuccessful result of the protocol testing process.

In some embodiments, the autoconfiguration manager is configured to determine which of the autoconfiguration objects most recently reported a successful result of the protocol testing process. Prior to a device reboot, the autoconfiguration manager may store an indication of the autoconfiguration object that most recently reported the successful result. After the device reboot, the autoconfiguration manager may cause the autoconfiguration object that most recently reported the successful result to initiate its protocol testing process.

Another implementation of the present disclosure is a smart communications controller for building equipment. The smart communications controller includes an equipment port connected to the building equipment and a processing circuit configured to perform a protocol testing process. The protocol testing process includes receiving a message from the building equipment. The message includes a plurality of equipment attributes. The protocol testing process includes comparing the plurality of equipment attributes to a set of protocol-specific equipment attribute mappings. Each protocol-specific attribute mapping corresponds to a different communications protocol. The protocol testing process includes identifying a communications protocol used by the building equipment in response to the plurality of equipment attributes matching the protocol-specific attribute mapping corresponding to the communications protocol. The processing circuit further includes an equipment controller configured to use the identified communications protocol to generate protocol-specific control signals for the building equipment and operate the building equipment to affect a variable state or condition within the building.

In some embodiments, the processing circuit is configured to perform an equipment identification process after the communications protocol used by the building equipment is identified. The equipment identification process may use the identified communications protocol to identify the building equipment connected to the equipment port.

In some embodiments, the processing circuit includes an equipment model manager configured to use an identity of the building equipment determined by the equipment identification process to select an equipment model for the building equipment.

In some embodiments, the processing circuit includes a plurality of autoconfiguration objects. Each of the autoconfiguration objects may correspond to a different communications protocol and may be configured to perform the protocol testing process for the corresponding communications protocol.

In some embodiments, the processing circuit includes an autoconfiguration manager configured to cause the autoconfiguration objects to iteratively perform their protocol testing processes until the communications protocol used by the building equipment is identified.

In some embodiments, each of the plurality of autoconfiguration objects is configured to report a result of the protocol testing process to the autoconfiguration manager. The autoconfiguration manager may be configured to terminate a first protocol testing process performed by a first autoconfiguration object in response to the first autoconfiguration object reporting a successful result of the first protocol testing process. The autoconfiguration manager may be configured to cause a second autoconfiguration object to initiate a second protocol testing process in response to the first autoconfiguration object reporting an unsuccessful result of the first protocol testing process.

In some embodiments, the autoconfiguration manager is configured to maintain a list of the autoconfiguration objects and determine whether a currently-active autoconfiguration object is a last autoconfiguration object in the list. If the currently-active autoconfiguration object is not the last autoconfiguration object in the list, the autoconfiguration manager may cause a next autoconfiguration object in the list to initiate a next protocol testing process in response to the currently-active autoconfiguration object reporting an unsuccessful result of the protocol testing process. If the currently-active autoconfiguration object is the last autoconfiguration object in the list, the autoconfiguration manager may cause a first autoconfiguration object in the list to initiate a first protocol testing process in response to the currently-active autoconfiguration object reporting an unsuccessful result of the protocol testing process.

In some embodiments, the autoconfiguration manager is configured to determine which of the autoconfiguration objects most recently reported a successful result of the protocol testing process. Prior to a device reboot, the autoconfiguration manager may store an indication of the autoconfiguration object that most recently reported the successful result. After the device reboot, the autoconfiguration manager may cause the autoconfiguration object that most recently reported the successful result to initiate its protocol testing process.

Another implementation of the present disclosure is a method for interacting with building equipment. The method includes identifying a plurality of autoconfiguration objects. Each of the autoconfiguration objects corresponds to a different communications protocol. The method includes causing each autoconfiguration object of the plurality of autoconfiguration objects to perform a protocol testing process. The protocol testing process includes determining whether the communications protocol corresponding to the autoconfiguration object supports sending a request for an equipment ID to the building equipment, selecting a protocol identification technique based on whether the corresponding communications protocol supports sending the request for the equipment ID to the building equipment, and using the selected protocol identification technique to automatically determine whether the corresponding communications protocol is used by the building equipment. The method further includes causing the autoconfiguration objects to iteratively perform their protocol testing processes until the communications protocol used by the building equipment is identified and using the identified communications protocol for the building equipment to generate protocol-specific control signals for the building equipment and to operate the building equipment to affect a variable state or condition within the building.

In some embodiments, the method includes performing an equipment identification process after the communications protocol used by the building equipment is identified. Performing the equipment identification process may include using the identified communications protocol to identify the building equipment.

In some embodiments, the method includes using an identity of the building equipment determined by performing the equipment identification process to select an equipment model for the building equipment.

In some embodiments, the protocol testing process includes sending a request message to the building equipment using the corresponding communications protocol in response to a determination that the corresponding communications protocol supports sending the request for the equipment ID to the building equipment. The request message may include a request for an equipment ID. The protocol testing process may include receiving a response message from the building equipment in response to the request and identifying the corresponding communications protocol as being used by the building equipment in response to the response message including the requested equipment ID.

In some embodiments, the protocol testing process includes receiving a message from the building equipment in response to a determination that the corresponding communications protocol does not support sending the request for the equipment ID to the building equipment. The message may include a plurality of equipment attributes. The protocol testing process may include comparing the plurality of equipment attributes to a set of protocol-specific equipment attribute mappings. Each protocol-specific attribute mapping may correspond to a different communications protocol. The protocol testing process may include identifying a communications protocol used by the building equipment in response to the plurality of equipment attributes matching the protocol-specific attribute mapping corresponding to the communications protocol.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
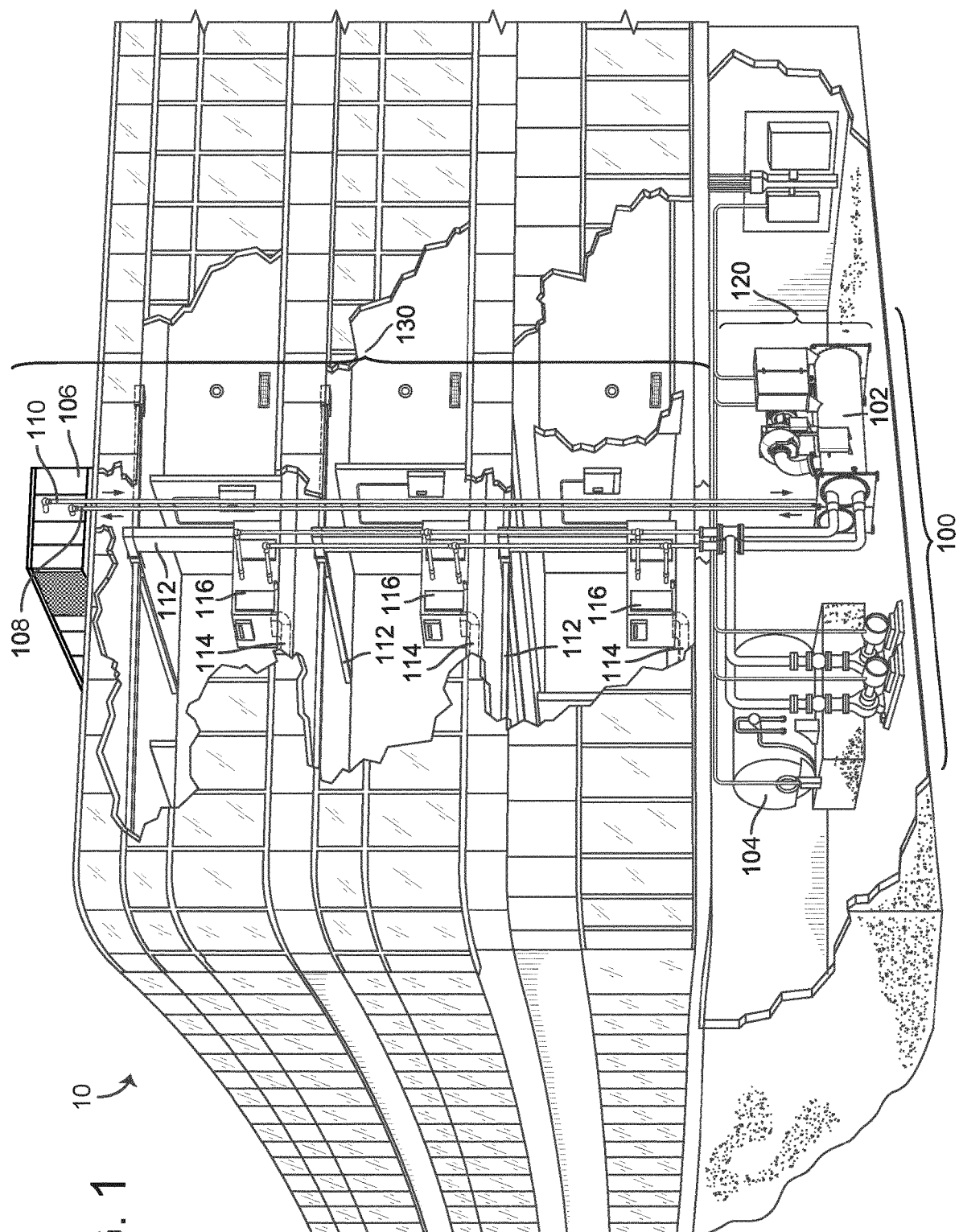
FIG. 1 is a drawing of a building equipped with a building automation system (BAS) which includes a heating, ventilating, or air conditioning (HVAC) system, according to an exemplary embodiment.

Referring generally to the FIGURES, a building automation system with a smart communications controller for building equipment is shown, according to an exemplary embodiment. The building automation system may include building equipment that can be used to perform, monitor, control, and/or automate building-related functions. For example, the building equipment may include HVAC equipment, electrical equipment, lighting equipment, fire safety equipment, security equipment, information communication technology (ICT) equipment, and lift/escalator equipment and/or other types of controllable building equipment. The smart communications controller may be configured to control the building equipment.

In some embodiments, the smart communications controller includes an equipment port connected to the building equipment, a building automation system (BAS) port connected to a BAS network, and a communications interface connected to an external communications network (e.g., a LAN, the Internet, etc.). The smart communications controller may be configured to act as a translation layer between the native communications protocols of the building equipment connected to the equipment port (e.g., MSTP, Modbus Master, YorkTalk 2, YorkTalk 3, etc.), the BAS protocol used by the BAS network connected to the BAS port (e.g., MSTP, Modbus Slave, N2 Slave, Zigbee, etc.), and/or the external communications protocol used by the external systems or devices connected to communications interface 508 (e.g., Ethernet, WiFi, cellular, etc.).

Advantageously, the smart communications controller may be configured to automatically detect the communications protocols used by the building equipment connected to the equipment port, the BAS network connected to the BAS port, and/or the external devices connected to the communications interface. In some embodiments, the smart communications controller performs an autoconfiguration scan to detect the communications protocols for each of the ports and interfaces of the controller.

The smart communications controller may include an autoconfiguration manager configured to manage the autoconfiguration scan. The autoconfiguration manager may use a plurality of autoconfiguration objects (ACOS) to perform the autoconfiguration scan. Each ACO may be configured to test for a particular protocol. The autoconfiguration manager may iteratively select each of the ACOs and allow the selected ACO to test the corresponding port or interface to determine whether the tested protocol is the correct protocol for that port or interface. If an ACO detects that a particular protocol is correct, the ACO may report a successful detection to the autoconfiguration manager.

Once a communications protocol has been successfully identified for a particular port or interface, the smart communications controller may identify the equipment or device connected to that port or interface. The controller may use the protocol-specific ACO that successfully identified the correct protocol to perform the equipment identification. Different ACOs may use different identification techniques to perform the equipment identification. For example, some of the ACOs may send a request for the device ID to building equipment. If the protocol used by the ACO is correct, the building equipment may reply with a message that includes the device ID, name, model, and/or other identifying attributes. Other ACOs may scan all of the available attributes of messages received from the building equipment. The controller may compare the attributes to various sets of equipment attribute mappings from an attribute mapping database. If a match is found, the controller may determine that the building equipment is the same as the equipment defined and identified by the attribute mappings.

Unlike conventional techniques, the smart communications controller does not classify the connected building equipment (or any other connected device) as self-describing or non-self-describing. Such a classification is not necessary to accomplish the autoconfiguration scan. Rather than classifying a connected device as self-describing or non-self-describing, the controller uses individual ACOs to perform protocol-specific autoconfiguration processes that vary based on the configuration of each ACO, not the configuration of the connected device. Some ACOs may be configured to determine both the correct communications protocol for a particular port or interface and identity of the device connected to that port or interface. Other ACOs may be configured to determine only the correct communications protocol, but not the identity of the connected device.

The smart communications controller may be configured to select an equipment model based on the identity of the connected building equipment. In some embodiments, the controller accesses an equipment model database and retrieves an equipment model based on the identity of the connected building equipment. The controller may use the selected equipment model and the detected communications protocol to generate protocol-specific control signals for the connected building equipment. The controller may then provide the protocol-specific control signals to the building equipment via the equipment port. These and other features of the smart communications controller are described in greater detail below.

Building Automation System and HVAC System

Referring now to FIGS. 1-4, an exemplary building automation system (BAS) and HVAC system in which the systems and methods of the present invention may be implemented are shown, according to an exemplary embodiment. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
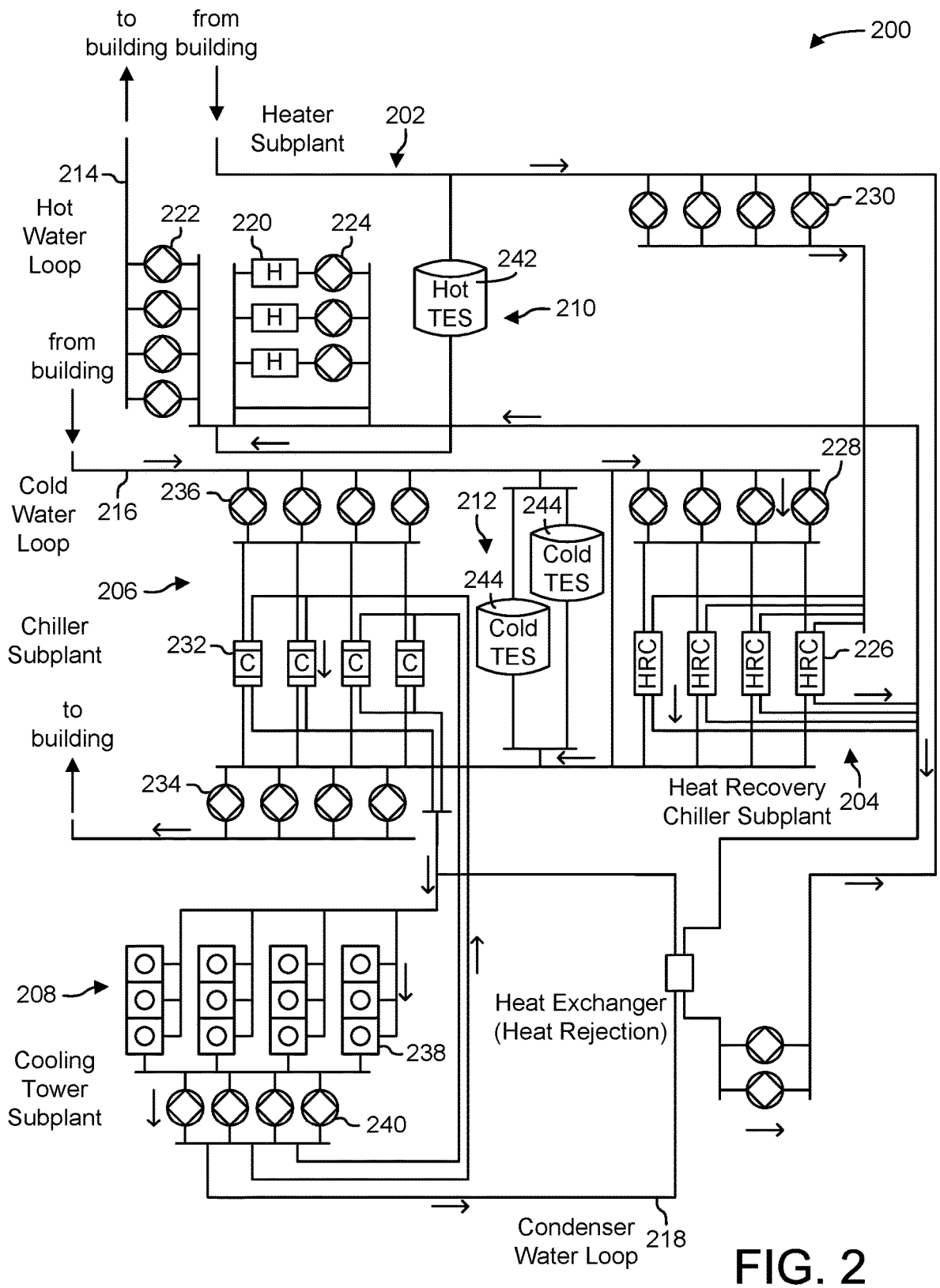
FIG. 2 is a schematic diagram of a waterside system which may be used to serve the building of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
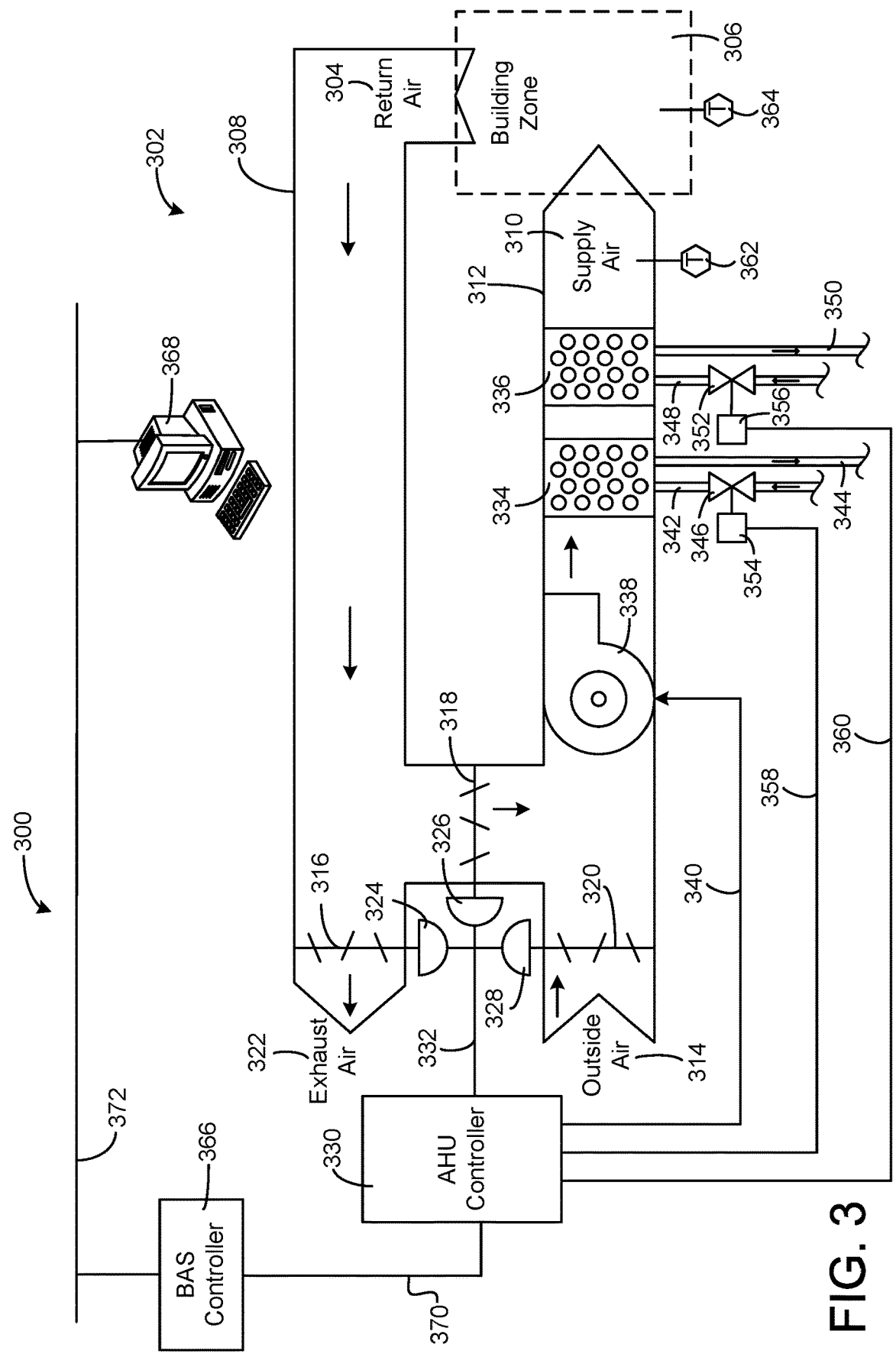
FIG. 3 is a block diagram of an airside system which may be used to serve the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 may be separate (as shown in FIG. 3) or integrated. In an integrated implementation, AHU controller 330 may be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 may provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BAS controller 366 and/or AHU controller 330 via communications link 372.

Figure 4:
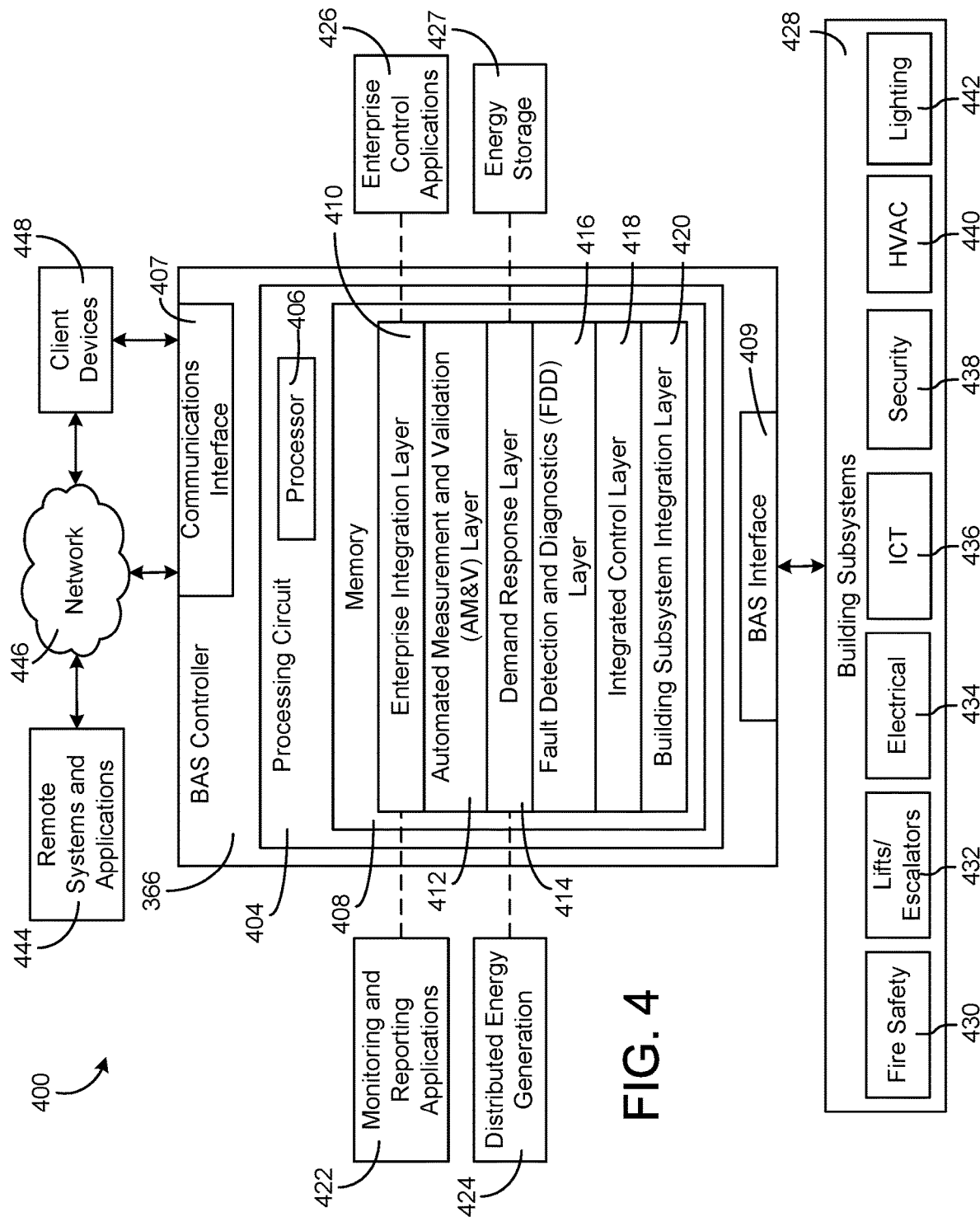
FIG. 4 is a block diagram of a BAS which may be used in conjunction with the building of FIG. 1, according to an exemplary embodiment.

Referring now to FIG. 4, a block diagram of a building automation system (BAS) 400 is shown, according to an exemplary embodiment. BAS 400 may be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 may facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 may also facilitate communications between BAS controller 366 and client devices 448. BAS interface 409 may facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 may be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 may be distributed across multiple servers or computers (e.g., that can exist in distributed locations). Further, while FIG. 4 shows applications 422 and 426 as existing outside of BAS controller 366, in some embodiments, applications 422 and 426 may be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration layer 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 may be configured to manage communications between BAS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BAS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BAS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BAS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Smart Communications Control System

Figure 5:
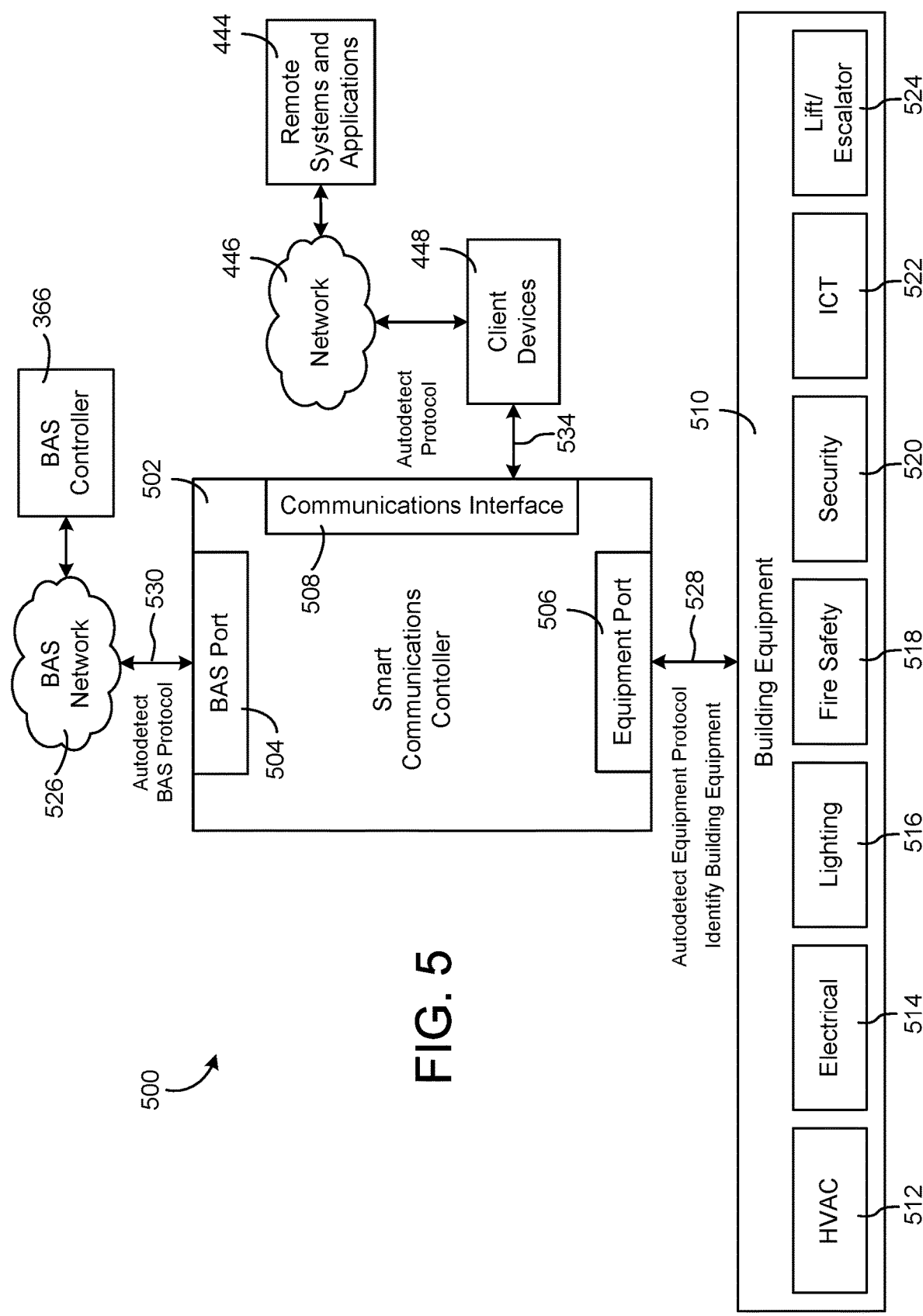
FIG. 5 is a block diagram of a smart communications control system including a smart communications controller which may be used to automatically determine a communications protocol used by connected building equipment, according to an exemplary embodiment.

Referring now to FIG. 5, a smart communications control system 500 is shown, according to an exemplary embodiment. In some embodiments, control system 500 is a portion of BAS 400. Control system 500 may include some or all of the components of BAS 400. For example, control system 500 is shown to include BAS controller 366, remote systems and applications 444, network 446, and client devices 448. These components may be the same or similar as described with reference to FIG. 4.

Control system 500 is shown to include building equipment 510. Building equipment 510 may include any type of equipment that can be used to perform, monitor, control, or automate various building-related functions and/or control activities. For example, building equipment 510 is shown to include HVAC equipment 512, electrical equipment 514, lighting equipment 516, fire safety equipment 518, security equipment 520, information communication technology (ICT) equipment 522, and lift/escalator equipment 524. In various embodiments, building equipment 510 can include fewer, additional, or alternative types of building equipment. For example, building equipment 510 may also or alternatively include refrigeration equipment, advertising or signage equipment, cooking equipment, vending equipment, printer or copy services equipment, or any other type of equipment that can be used in or around a building. In some embodiments, building equipment 510 includes the equipment of building subsystems 428, waterside system 200, and/or airside system 300, as described with reference to FIGS. 2-4.

Each category of building equipment 510 may include any number of devices, controllers, sensors, or other types of equipment for completing its individual functions and control activities. For example, HVAC equipment 512 may include one or more chillers, boilers, heaters, air handling units, economizers, flow control units, pumps, valves, dampers, actuators, sensors, and/or other types of equipment that can be used to monitor or control a variable state or condition (e.g., temperature, humidity, airflow, etc.) in a building. Lighting equipment 516 may include any number of light fixtures, ballasts, lighting sensors, dimmers, or other devices configured to controllably adjust the amount of light provided to a building space. Security equipment 520 may include occupancy sensors, video surveillance cameras, digital video recorders, video processing servers, intrusion detection devices, access control devices and servers, or other security-related devices.

In some embodiments, building equipment 510 includes a single device or a set of related devices. For example, building equipment 510 may include a single chiller or a set of chillers configured to communicate using the same communications protocol. Multiple instances of control system 500 may be provided throughout a building. Each instance of control system 500 may include a particular type of building equipment 510. For example, one instance of control system 500 may include a set of chillers in a building HVAC system, whereas another instance of control system 500 may include an air handling unit for the building HVAC system. Each instance of control system 500 may be configured to communicate with BAS controller 366 (e.g., via BAS network 526) to allow BAS controller 366 to monitor and/or control the various types of building equipment 510.

Still referring to FIG. 5, control system 500 is shown to include a smart communications controller 502. In some embodiments, an instance of smart communications controller 502 is provided for each instance of control system 500. Controller 502 is shown to include a BAS port 504 and an equipment port 506. In some embodiments, BAS port 504 and equipment port 506 are serial ports (e.g., RS-232 or RS-485 serial ports) or other types of serial communications interfaces. In other embodiments, BAS port 504 and equipment port 506 may be parallel ports or other types of non-serial communications interfaces. BAS port 504 and equipment port 506 may include wired or wireless communications interfaces (e.g., jacks, antennas, transmitters, receivers, transceivers, wire terminals, etc.) for conducting data communications with BAS network 526 and building equipment 510, respectively.

Equipment port 506 may be connected to building equipment 510 via an equipment communications link 528. Different types and/or instances of building equipment 510 may be configured to communicate using different equipment communications protocols. For example, some instances of building equipment 510 (e.g., chillers) may be configured to communicate using a master/slave token passing (MSTP) communications protocol (i.e., a BACnet datalink-level token ring protocol), whereas other instances of building equipment 510 may be configured to communicate using the Modbus Master communications protocol or one or more of the YorkTalk communications protocols (e.g., YorkTalk 2, YorkTalk 3, etc.). In some embodiments, controller 502 includes multiple equipment ports 506. Each equipment port 506 may be connected to a different type and/or instance of building equipment 510. The building equipment 510 connected to each equipment port 506 may be configured to communicate using the same communications protocol or different communications protocols.

Advantageously, smart communications controller 502 may be configured to automatically detect the communications protocol(s) used by the connected building equipment 510. Controller 502 may be configured to automatically identify the connected building equipment 510 (e.g., by equipment type, name, model, etc.) and select an appropriate equipment model based on the identity of the connected building equipment 510. Controller 502 may use the selected equipment model and the detected communications protocol to generate protocol-specific control signals for the connected building equipment 510. Controller 502 may provide the protocol-specific control signals to building equipment 510 via equipment port 506.

BAS port 504 may be connected to BAS network 526 via a BAS communications link 530. BAS network 526 may be configured to communicate using any of a variety of BAS communications protocols. For example, BAS network 526 may use the MSTP communications protocol, the Modbus Slave communications protocol, the N2 Slave communications protocol, the Zigbee communications protocol, or various other BAS communications protocols (e.g., METASYS®, BACnet, LonTalk, etc.). Controller 502 may be configured to automatically detect the BAS communications protocol used by BAS network 526. Controller 502 may translate between the BAS communications protocol and the equipment communications protocols to enable communications between BAS network 526 and building equipment 510.

In some embodiments, smart communications controller 502 includes a communications interface 508. Communications interface 508 may be a connected services port. Communications interface 508 may include wired or wireless communications interfaces (e.g., jacks, antennas, transmitters, receivers, transceivers, wire terminals, etc.) for conducting data communications with network 446, client devices 448, or other external systems or devices (e.g., remote systems and applications 444). Communications interface 508 may be configured to communicate directly with such external systems or devices (e.g., local wired or wireless communications) or via communications network 446 (e.g., a WAN, the Internet, a cellular network, etc.). In some embodiments, communications interface 508 includes an Ethernet card and port for sending and receiving data via an Ethernet-based communications link or network. In some embodiments, communications interface 508 is a power line communications interface. In some embodiments, communications interface 508 includes a WiFi transceiver, Bluetooth transceiver, NFC transceiver, cellular transceiver, or other wireless transceiver for communicating via a wireless communications network.

Communications interface 508 may be connected to network 446 via a communications link 532 and to client devices 448 via a communications link 534. Network 446 and client devices 448 may be configured to communicate using any of a variety of communications protocols. For example, network 446 may be a WiFi network (e.g., a building LAN) configured to use the IEEE 802.11 communications protocol, an Ethernet network configured to use an Ethernet communications protocol, a cellular network configured to use a cellular communications protocol, an Internet network configured to use a TCP/IP communications protocol, or any other type of network configured to use any other type of communications protocol. Client devices 448 may connect to communications interface 508 via network 446 or directly. Client devices 448 may communicate directly with communications interface 508 using any of a variety of wired or wireless communications protocols (e.g., WiFi direct, NFC, Bluetooth, Ethernet, etc.).

Smart communications controller 502 may be configured to act as a translation layer between the native communications protocols of the building equipment 510 connected to equipment port 506 (e.g., MSTP, Modbus Master, YorkTalk 2, YorkTalk 3, etc.), the BAS protocol used by the BAS network 526 connected to BAS port 504 (e.g., MSTP, Modbus Slave, N2 Slave, Zigbee, etc.), and/or the external communications protocol used by the external systems or devices connected to communications interface 508 (e.g., Ethernet, WiFi, cellular, etc.). In some embodiments, controller 502 includes a plurality of datalink objects (DLOs). Each datalink object may be configured to handle communications using a particular communications protocol.

Advantageously, smart communications controller 502 may be configured to automatically detect the communications protocols used by the building equipment 510 connected to equipment port 506, the BAS network 526 connected to BAS port 504, and/or the external devices connected to communications interface 508. In some embodiments, controller 502 performs an autoconfiguration scan to detect the communications protocols for each of the ports and interfaces 504-508. Controller 502 may include an autoconfiguration manager configured to manage the autoconfiguration scan. In some embodiments, controller 502 creates a separate instance of the autoconfiguration manager for each of the ports and interfaces 504-508 for which a communications protocol is to be detected.

The autoconfiguration manager may use a plurality of autoconfiguration objects (ACOS) stored within controller 502 to perform the autoconfiguration scan. Each ACO may be configured to test for a particular protocol. The autoconfiguration manager may iteratively select each of the ACOs and allow the selected ACO to test the corresponding port or interface to determine whether the tested protocol is the correct protocol for that port or interface. If an ACO detects that a particular protocol is correct, the ACO may report a successful detection to the autoconfiguration manager. The autoconfiguration manager may terminate the autoconfiguration scan in response to a successful protocol detection. The autoconfiguration scan is described in greater detail with reference to FIGS. 7-10.

Once a communications protocol has been detected for a particular port or interface, controller 502 may identify the equipment or device connected to that port or interface. Controller 502 may use the ACO that successfully identified the correct protocol to perform the equipment identification. Different ACOs may use different identification techniques to perform the equipment identification. For example, some of the ACOs may send a request for the device ID to building equipment 510. If the protocol used by the ACO is correct, building equipment 510 may reply with a message that includes the device ID, name, model, and/or other identifying attributes. Other ACOs may scan all of the available attributes of messages received from building equipment 510. Controller 502 may compare the attributes to various sets of equipment attribute mappings from an attribute mapping database. If a match is found, controller 502 may determine that the building equipment 510 is the same as the equipment defined and identified by the attribute mappings.

Unlike conventional techniques, controller 502 does not classify the connected building equipment 510 (or any other device connected to ports 504-508) as self-describing or non-self-describing. Such a classification is not necessary to accomplish the autoconfiguration scan. Rather than classifying a connected device as self-describing or non-self-describing, controller 502 uses individual ACOs to perform protocol-specific autoconfiguration processes that vary based on the configuration of each ACO, not the configuration of the connected device. Some ACOs may be configured to determine both the correct communications protocol for a particular port or interface and identity of the device connected to that port or interface. Other ACOs may be configured to determine only the correct communications protocol, but not the identity of the connected device.

Controller 502 may be configured to select an equipment model based on the identity of the connected building equipment 510. For example, controller 502 may access an equipment model database and retrieve an equipment model corresponding to the model, name, and/or device ID of the connected building equipment. Controller 502 may use the selected equipment model and the detected communications protocol to generate protocol-specific control signals for the connected building equipment 510. Controller 502 may then provide the protocol-specific control signals to building equipment 510 via equipment port 506.

Smart Communications Controller

Figure 6:
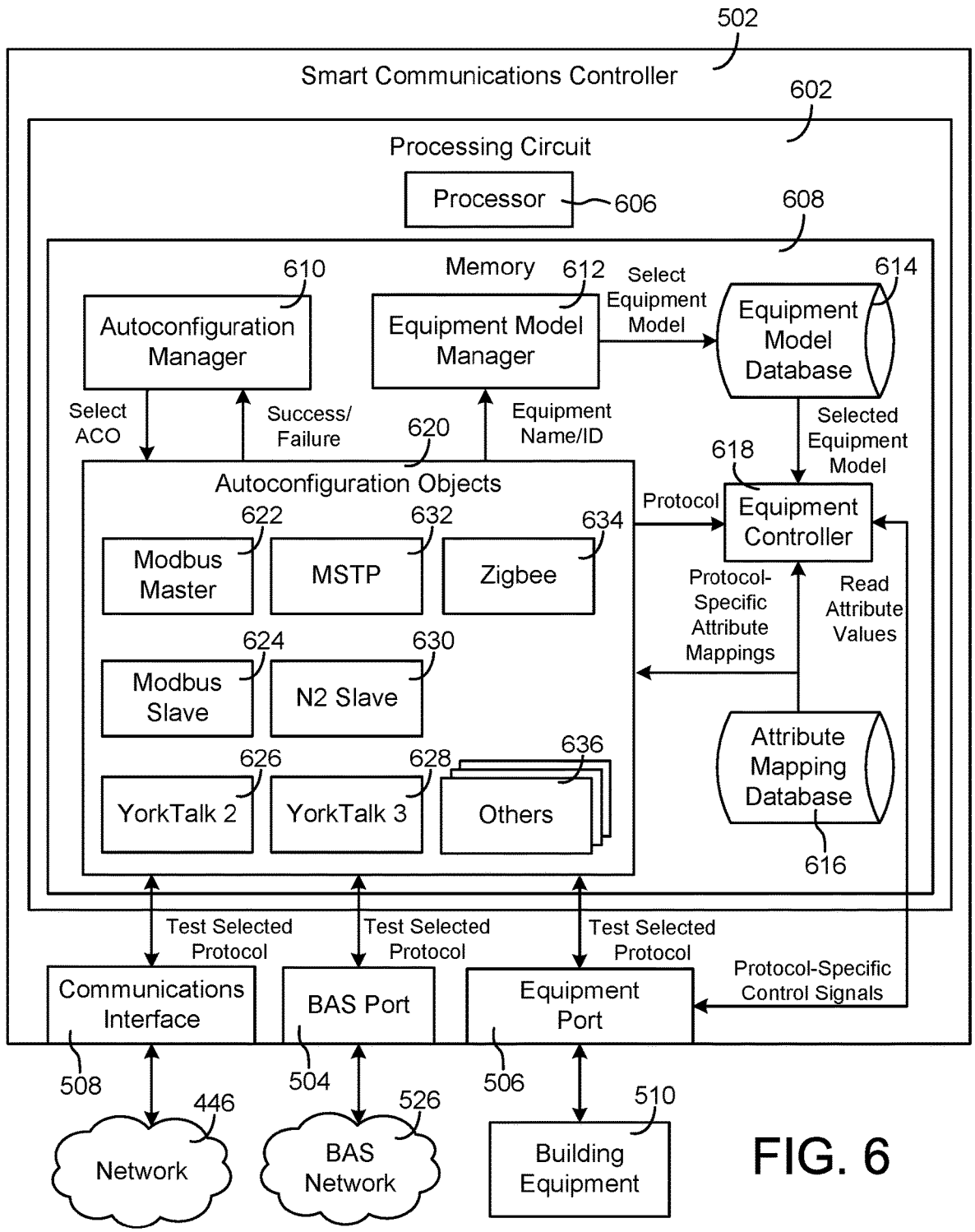
FIG. 6 is block diagram illustrating the smart communications controller of FIG. 5 in greater detail, according to an exemplary embodiment.

Referring now to FIG. 6, a block diagram illustrating smart communications controller 502 in greater detail is shown, according to an exemplary embodiment. Smart communications controller 502 is shown to include BAS port 504, equipment port 506, communications interface 508. BAS port 504 may be connected to BAS network 526 via BAS communications link 530. Equipment port 506 may be connected to building equipment 510 via equipment communications link 528. Communications interface 508 may be connected to communications network 446 and/or other external systems or devices (e.g., connected services) via an external communications link 532. Although only three physical ports are shown in FIG. 6, it should be understood that smart communications controller 502 may include any number of physical ports. Each port may connect to different equipment or systems, which may be configured to communicate using different native communications protocols.

Smart communications controller 502 is shown to include a processing circuit 602 having a processor 606 and memory 608. Processor 606 may be a general purpose or specific purpose processor, an application specific integrated circuit (ASIC), one or more field programmable gate arrays (FPGAs), a group of processing components, or other suitable processing components. Processor 606 is configured to execute computer code or instructions stored in memory 608 or received from other computer readable media (e.g., CDROM, network storage, a remote server, etc.).

Memory 608 may include one or more devices (e.g., memory units, memory devices, storage devices, etc.) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. Memory 608 may include database components, object code components, script components, or any other type of information structure for supporting the various activities and information structures described in the present disclosure. Memory 608 may be communicably connected to processor 606 via processing circuit 602 and may include computer code for executing (e.g., by processor 606) one or more processes described herein. When processor 606 executes instructions stored in memory 608, processor 606 generally configures controller 502 (and more particularly processing circuit 602) to complete such activities.

Still referring to FIG. 6, smart communications controller 502 is shown to include an autoconfiguration manager 610. In some embodiments, autoconfiguration manager 610 is an autoconfiguration manager object (ACMO) stored within memory 608. Autoconfiguration manager 610 may be configured to manage the automatic configuration of a specified communication port or interface to use an automatically-detected communications protocol. In various embodiments, autoconfiguration manager 610 manages the configuration of serial ports, parallel ports, and/or any other type of communication port or interface of controller 502 (e.g., BAS port 504, equipment port 506, communications interface 508, etc.).

In some embodiments, controller 502 includes a separate instance of autoconfiguration manager 610 for each port or interface of controller 502. Each instance of autoconfiguration manager 610 may be assigned to a particular port or interface of controller 502. For example, controller 502 may include a first instance of autoconfiguration manager 610 for BAS port 504, a second instance of autoconfiguration manager 610 for equipment port 506, and a third instance of autoconfiguration manager 610 for communications interface 508. Throughout this disclosure, the port or interface to which an instance of autoconfiguration manager 610 is assigned is referred to as the corresponding port or interface. Each instance of autoconfiguration manager 610 may be configured to implement a staged autoconfiguration procedure for the corresponding port or interface. In other embodiments, a single instance of autoconfiguration manager 610 is assigned to multiple ports and/or interfaces of controller 502.

Advantageously, autoconfiguration manager 610 may facilitate "plug-and-play" operation for smart communications controller 502. For example, a port or interface of controller 502 can be connected to an active network (e.g., a BAS network, a building equipment network, a LAN, etc.) without preconfiguring or setting controller 502 to a particular protocol. Autoconfiguration manager 610 may automatically determine what protocol is operating on that network and configure the port or interface to communicate on that network without any user action required.

Still referring to FIG. 6, smart communications controller 502 is shown to include a plurality of autoconfiguration objects (ACOS) 620. ACOs 620 may be protocol-specific objects configured to determine whether a specific protocol is correct for a port or interface of controller 502. ACOs 620 are shown to include a Modbus Master ACO 622, a Modbus Slave ACO 624, a YorkTalk 2 ACO 626, a YorkTalk 3 ACO 628, a N2 Slave ACO 630, a MSTP ACO 632, a Zigbee ACO 634, and others 636 (e.g., KNX, Ethernet, BACnet IP, Modbus IP, etc.). Each of ACOs 620 corresponds to a particular communications protocol (e.g., Modbus Master, Modbus Slave, YorkTalk 2, etc.) and may be configured to determine whether that protocol is correct for a port or interface of controller 502.

Although several specific examples of ACOs 620 and corresponding communications protocols are shown in FIG. 6, it should be understood that these ACOs and communications protocols are merely exemplary. It is contemplated that additional, fewer, and/or different ACOs may be used in various embodiments. In some embodiments, controller 502 is configured to receive additional ACOs from an external data source (e.g., via a software or firmware update) and may update ACOs 620 accordingly. In some embodiments, ACOs 620 may be combined with autoconfiguration manager 610. For example, the functionality provided by ACOs 620 may be incorporated into autoconfiguration manager 610.

In some embodiments, ACOs 620 include datalink objects. Datalink objects may be configured to manage the normal operation of a datalink protocol through a communication port. Datalink objects may include any other communication task(s) used by ACOs 620 to implement the datalink protocol that the datalink object is designed to support. Advantageously, ACOs 620 may include both datalink objects and the additional functionality to perform automatic configuration processes (e.g., protocol detection, device identification, etc.). ACOs 620 may also be configured to interface with autoconfiguration manager 610. For example, each of ACOs 620 may have autoconfiguration capabilities for a specific protocol and may interface with autoconfiguration manager 610 so that autoconfiguration manager 610 can control the ACO's autoconfiguration operations and communications session.

In some embodiments, autoconfiguration manager 610 maintains a list of ACOs 620 that can be used for automatic protocol detection. This list of ACOs 620 is referred to as the "ACO scan list." The ACO scan list may be received from an external data source or generated by autoconfiguration manager 610 based on the ACOs 620 stored in memory 608. In some embodiments, autoconfiguration manager 610 modifies an ACO scan list received from an external data source by removing entries that do not correspond to one of the ACOs 620 stored in memory 608.

In some embodiments, each instance of autoconfiguration manager 610 maintains a separate ACO scan list. The ACO scan list for a particular instance of autoconfiguration manager 610 may define a set or subset of ACOs 620 (e.g., some or all of ACOs 620) that the instance of autoconfiguration manager 610 will use to test the corresponding port or interface of controller 502. In some embodiments, the ACO scan list for an instance of autoconfiguration manager 610 includes an ACO for each communications protocol that the corresponding port or interface can or will support. For example, the ACO scan list for the instance of autoconfiguration manager 610 that corresponds to equipment port 506 may include Yorktalk 3 ACO 628, YorkTalk 2 ACO 626, Modbus Master ACO 622, MSTP ACO 632 (e.g., wired or wireless), Zigbee ACO 634, or any other ACO that can be used to communicate using a communications protocol used by building equipment 510. The ACO scan list for the instance of autoconfiguration manager 610 that corresponds to BAS port 504 may include MSTP ACO 632 (e.g., wired or wireless), Modbus Slave ACO 624, N2 Slave ACO 630, Zigbee ACO 634, or any other ACO that can be used to communicate using a communications protocol used by BAS network 526. The ACO scan list for the instance of autoconfiguration manager 610 that corresponds to communications interface 508 may include MSTP ACO 632 (e.g., wired or wireless), Zigbee ACO 634, or any other ACO that can be used to communicate using a communications protocol used by network 446 or an external system or device connected to network 446. In general, the ACO scan list for a specified port or interface (e.g., port X) may include ACOs for any communications protocol (e.g., protocol_1, protocol_2, protocol_3, . . . , protocol_N) that can be automatically detected for the specified port or interface. The list of supported ACOs and corresponding protocols may be configurable and/or extendable for each instance of autoconfiguration manager 610. Each instance of autoconfiguration manager 610 may allow each of the ACOs in its ACO scan list to run sequentially (e.g., in a round robin fashion) until the correct communications protocol for the corresponding port or interface is successfully identified.

The ACO scan list may include one or more of the following parameters for each ACO entry: ACO protocol identifier, ACO class, item name, wait timeout, delete delay, initialization table pointer, persistence size, object create type, OID, BACnet class, and BACnet OID. The ACO protocol identifier may be an enumerated data value that identifies the communications protocol used by the ACO (e.g., Modbus Master, Modbus Slave, MSTP, YorkTalk 2, YorkTalk 3, etc.). The ACO class parameter may identify the object class of the ACO. The item name parameter may be a pointer to a character string providing the name displayed in the ACO scan list (e.g., identifying the ACO by the name of the protocol that the ACO represents).

The wait timeout parameter may define an amount of time to wait for the ACO to determine if the corresponding protocol is correct for the tested port or interface. In some embodiments, the wait timeout parameter has a maximum value (e.g., 6 minutes or 360 seconds) that defines an upper threshold for permissible wait timeout values. If a wait timeout value greater than the maximum value is specified, autoconfiguration manager 610 may use the maximum timeout value instead of the specified value. The delete delay parameter may define an amount of time (e.g., 2-10 seconds) that autoconfiguration manager 610 waits after deleting the ACO before proceeding with a new autoconfiguration scan.

The initialization table pointer may specify the location of initialization information (i.e., an initialization table) for the ACO. The initialization information may be passed to the ACO during initialization (e.g., when the ACO is selected for testing). Autoconfiguration manager 610 may not know the structure of the initialization information; the initialization information may be specific to the class of ACO and only the ACO may know its structure. If the ACO does not require any initialization information, the initialization table pointer parameter may be set to null.

The persistence size parameter may define the amount of memory (e.g., in octets) that the ACO will save in a persistence file for autoconfiguration manager 610. In some embodiments, the persistence file is configured to hold persistent information for the ACO that is currently active for a particular port or interface. The persistence file may be used by autoconfiguration manager 610 to persist an active ACO and configuration parameter values for the ACO to retain through a device power cycle. On subsequent startup, if autoconfiguration manager 610 finds the persistence file to be viable, then the ACO specified in the persistence file may be selected and started-up (unless a different ACO has already determined or locked the correct protocol). The persistence file allows autoconfiguration manager 610 to record the identity of the active ACO. After a power cycle, autoconfiguration manager 610 may give the ACO specified in the persistence file the first chance to run in the autoconfiguration process. The persistence file may include, for example, the active ACO protocol ID, the active ACO class, a protocol lock (e.g., a Boolean value indicating whether the ACO protocol has been determined to be correct), an ACO persistence data length (defined by the persistence size parameter), and active ACO persistence data.

The object create type parameter may specify the type of object created by autoconfiguration manager 610 when the ACO is selected or loaded. In some embodiments, the object create type parameter can specify that the ACO should be created using a simple create process or with a BACnet OID. The simple create process may be specified if the ACO is not representing a BACnet protocol and does not have integrated datalink object functionality. However, if the ACO includes datalink functionality and/or represents a BACnet protocol, the more complex BACnet OID creation process may be specified. The simple create process may create the ACO without making the ACO a child of autoconfiguration manager 610. If and when the ACO reports a successful protocol detection, the ACO may then be set as a child of autoconfiguration manager 610. However, if the ACO is the only ACO in the scan list or if the ACO is otherwise certain to be locked in, the ACO may be created as a child of autoconfiguration manager 610.

The OID, BACnet class, and BACnet OID parameters may be used in the BACnet OID creation process. These parameters may cause autoconfiguration manager 610 to create an associated BACnet OID for the ACO. In some embodiments, autoconfiguration manager 610 may check the ACO's header to determine if it should be BACnet exposed. If so, a BACnet exposed flag may be set to true for the ACO.

Still referring to FIG. 6, autoconfiguration manager 610 may perform a circular autoconfiguration scan by stepping through the ACO scan list. For example, autoconfiguration manager 610 may provide each ACO in the ACO scan list an opportunity to run on the specified port or interface to determine if the protocol associated with the ACO is correct for that port or interface. In some embodiments, autoconfiguration manager 610 iteratively selects each of the ACOs in the ACO scan list. When an ACO is selected, autoconfiguration manager 610 may create an instance of the ACO class. Autoconfiguration manager may initialize the selected ACO by providing the ACO with a set of communication parameters. The communication parameters may be obtained from device storage (e.g., the ACO scan list). In some embodiments, the communication parameters include the OID of autoconfiguration manager 610, the ACO protocol identifier, the ACO's initialization table pointer, the size of persistent data, persistence information (if available) for the selected ACO from the stored persistence file, and/or an indication of which port(s) or interface(s) should be tested by the ACO.

Autoconfiguration manager 610 may simulate the startup sequence provided by the runtime environment for the ACO. Simulating the startup sequence may include performing one or more startup routines for the ACO. These startup routines may be recorded in a startup table for the ACO and may include, for example, general startup procedures, enabling communications, starting inputs, restarting logic, starting features, and enabling field communications. In some embodiments, autoconfiguration manager 610 repeats any of the startup routines that have not completed until the ACO completes its work.

Each of ACOs 620 may be configured to perform an autoconfiguration process that includes automatically determining whether the protocol associated with the ACO is correct for a particular port or interface. When an ACO is selected by autoconfiguration manager 610, the ACO may perform the autoconfiguration process for the specified port or interface and report the results of the autoconfiguration process (e.g., a success or failure) to autoconfiguration manager 610. In some embodiments, the autoconfiguration process is a multistage autoconfiguration process. For example, the autoconfiguration process may include a protocol detection stage (e.g., protocol detection, baud rate detection, parity detection, etc.), an equipment identification stage (e.g., equipment manufacturer identification, equipment model identification, etc.), and an equipment model selection stage (e.g., equipment model loading for enabling automatic protocol conversion). In some embodiments, the protocol detection stage is performed by each of ACOs 620. The equipment identification stage and equipment model selection stage may be optional stages performed in any order after the protocol detection stage successfully completes. The autoconfiguration process is described in greater detail with reference to FIG. 7.

Autoconfiguration manager 610 may request that the ACO notify it when an outcome of protocol detection process has been determined. Autoconfiguration manager 610 may then wait for the selected ACO to report a result (e.g., a success or a failure) of the protocol detection process. In some embodiments, autoconfiguration manager 610 starts a timer when beginning to wait for an ACO. If the timer expires or reaches a specified value before the ACO reports a result, autoconfiguration manager 610 may advance to the next ACO in the ACO scan list. As previously described, each ACO may specify its own timeout period as a parameter of the entry for the ACO in the ACO scan list, up to a maximum value (e.g., 6 minutes or 360 seconds).

ACOs 620 may report the status of the protocol detection process to autoconfiguration manager 610. In some embodiments, autoconfiguration manager 610 obtains the status of the protocol detection process by subscribing to a change in value (COV) notification for an autoconfiguration status attribute of the ACO. The autoconfiguration status attribute may be selected from one of the following enumerated values: pending, success, success do reset, failure, and major error. An autoconfiguration status attribute of "pending" indicates that the ACO is in the process of determining whether the corresponding protocol is correct, but no outcome has been determined yet.

An autoconfiguration status attribute of "success" indicates that the outcome of the protocol testing is successful (i.e., the tested protocol is correct for the port or interface). In response to a successful result, autoconfiguration manager 610 may terminate the autoconfiguration scan and record the successful ACO and/or the associated datalink object as active for the tested port or interface. At this time, autoconfiguration manager 610 may record the active ACO in the persistence file to ensure that the active ACO is retained through a power cycle.

An autoconfiguration status attribute of "success do reboot" indicates that the ACO has successfully determined the correct protocol for the port or interface, but the ACO needs a device reboot performed to make required communications resources available to the ACO. Autoconfiguration manager 610 may perform the same steps that are performed in response to a successful result and then initiate a reboot of controller 502.

An autoconfiguration status attribute of "failure" indicates that the outcome of the protocol testing is unsuccessful (i.e., the tested protocol is not correct for the port or interface). This is an expected outcome until the correct ACO is given a chance to run. In response to a failure result, autoconfiguration manager 610 may advance to the next ACO in the ACO scan list. If the wait timeout period expires before a result of the protocol testing is obtained, autoconfiguration manager 610 may perform the same steps as if the result were a failure.

An autoconfiguration status attribute of "major error" indicates that the ACO cannot operate at all and should be flagged as inoperable. In response to a major error result, autoconfiguration manager 610 may remove the ACO from the ACO scan list, thereby preventing the ACO from being used in subsequent iterations of the autoconfiguration scan.

Still referring to FIG. 6, ACOs 620 may be configured to identify the particular type of building equipment 510 connected to equipment port 506, the particular type of BAS network 526 connected to BAS port 504, and/or the particular type of network or device connected to communications interface 508. In some embodiments, the equipment/network identification is performed in response to an ACO successfully determining the correct communications protocol for the corresponding port or interface. In other embodiments, the equipment/network identification is performed concurrently with the protocol identification.

As previously mentioned, some ACOs may be configured to determine both the correct communications protocol for a particular port or interface and identity of the device connected to that port or interface. Other ACOs may be configured to determine only the correct communications protocol, but not the identity of the connected device. In some embodiments, equipment identification is performed only for equipment port 506. For example, equipment identification may be performed for equipment port 506 by Yorktalk 3 ACO 628, YorkTalk 2 ACO 626, Modbus Master ACO

622, MSTP ACO 632 (e.g., wired or wireless), Zigbee ACO 634, or any other ACO that operates on equipment port 506. The identification technique may vary depending on the communications protocol and/or the ACO used to perform the identification. Exemplary identification techniques which may be performed by Modbus Master ACO 622, YorkTalk 2 ACO 626, and YorkTalk 3 ACO 628 are described below.

Modbus Master ACO 622 may be configured to send a device ID request to building equipment 510 using the Modbus Master communications protocol. If building equipment 510 is configured to communicate using the Modbus Master protocol, building equipment 510 may reply to the device ID request with a response message. An example of the device ID request and response message according to the Modbus Master protocol is shown in the following table:

| Modbus Device ID Request | | Modbus Response Message | |
|---|---|---|---|
| Field Name | Value | Field Name | Value |
| Node ID | 01 | Node ID | 01 |
| Function | 2B | Function | 2B |
| MEI Type | 0E | MEI Type | 0E |
| Read Dev Id code | 01 | Read Dev Id Code | 01 |
| Object Id | 00 | Conformity Level | 01 |
| Checksum | 7077 | More Follows | 00 |
| | | NextObjectId | 00 |
| | | Number Of Objects | 03 |
| | | Object Id | 00 |
| | | Object Length | 03 |
| | | Object Value | "JCI" |
| | | Object Id | 01 |
| | | Object Length | 04 |
| | | Object Value | "YSPA" |
| | | Object Id | 02 |
| | | Object Length | 17 |
| | | Object Value | "RMMYSPA-MB/V01.38" |
| | | Checksum | E332 |

Modbus Master ACO 622 may determine whether the response message complies with the Modbus Master communications protocol. For example, Modbus Master ACO 622 may determine whether the response message has the expected format, the expected number of parameters, the expected type of parameters, or other attributes that identify the response message as a Modbus Master message. If the response message complies with the Modbus Master protocol, Modbus Master ACO 622 may inform autoconfiguration manager 610 that Modbus Master is the correct communications protocol for equipment port 506.

Modbus Master ACO 622 may extract one or more object strings or values from the Modbus response message. For example, the exemplary Modbus response message in the preceding table is shown to include the object strings "JCI," "YSPA," and "RMMYSPA-MB/V01.38." Modbus Master ACO 622 may store these object strings respectively as the "deviceVendorName," "deviceProductCode," and "deviceMajorMinorRevision" of the connected building equipment 510. Modbus Master ACO 622 may use these object strings to identify building equipment 510. For example, Modbus Master ACO 622 may identify the type, name, model, version, or other attributes of building equipment 510 based on the object strings extracted from the Modbus response message. Modbus Master ACO 622 may provide the identity of building equipment 510 to equipment model manager 612.

YorkTalk 2 ACO 626 may be configured to send a panel ID request to building equipment 510 using the YorkTalk 2 communications protocol. YorkTalk 2 is a half-duplex protocol using RS-485-multi drop driver technology to pass data between equipment port 506 and building equipment 510. The following table illustrates the elements of a YorkTalk 2 message:

| Byte # | Element | Designation | Value/Range | Encoded Range |
|---|---|---|---|---|
| 1 | Header | Message Start (STX) | 0x02 | |
| 2 | | Target Network | 0x00-0x7F | 0x80-0xFF |
| 3 | | Target Node | | |
| 4 | | Source Network | | |
| 5 | | Source Node | | |
| 6 | | Message Type | | |
| 7 | | Message Number | | |
| 8-(8 + N) | Body | Command | 0x00-0xFF | 0x00, 0x01, 0x04-0xFF |
| 9 + N | Tail | Checksum | 0x00-0xFF | 0x80-0xFF |
| 10 + N | | Message End (ETX) | 0x02 | |

The header of a YorkTalk 2 message is shown to include the elements "message start (STX)," "target network," "target node," "source network," "source node," "message type," and "message number." The target network and target node parameters uniquely identify the actual device to which the message is to be directed. In some embodiments, the target node is the actual node number set by a series of dipswitches on building equipment 510 (e.g., the MAC address of building equipment 510). The target network parameter may define the network on which the target device is resident. The source network and source node parameters provide information about the device that is sending the message. The message type identifies the context of the data portion of this message. The message number is used by a client application to keep track of the request message and the associate response. The body of a YorkTalk 2 message is shown to include a "command" parameter. The command may include real numbers and binary values. In some embodiments, the command includes the panel ID request. The tail of a YorkTalk 2 message is shown to include a "checksum" parameter and a "message end" tag.

YorkTalk 2 ACO 626 may send a command message to building equipment 510 using the YorkTalk 2 protocol. The message may request the panel ID of building equipment 510. If building equipment 510 is configured to communicate using the YorkTalk 2 protocol, building equipment 510 may reply to the panel ID request with a response message. YorkTalk 2 ACO 626 may determine whether the response message complies with the YorkTalk 2 communications protocol. For example, YorkTalk 2 ACO 626 may determine whether the response message has the expected format, the expected number of parameters, the expected type of parameters, or other attributes that identify the response message as a YorkTalk 2 message. If the response message complies with the YorkTalk 2 protocol, YorkTalk 2 ACO 626 may inform autoconfiguration manager 610 that YorkTalk 2 is the correct communications protocol for equipment port 506.

YorkTalk 2 ACO 626 may extract one or more attributes from the YorkTalk 2 response message and use the extracted attributes to identify building equipment 510. For example, YorkTalk 2 ACO 626 may identify the type, name, model, version, or other attributes of building equipment 510 based on the attributes extracted from the YorkTalk 2 response message. YorkTalk 2 ACO 626 may provide the identity of building equipment 510 to equipment model manager 612.

YorkTalk 3 ACO 628 may be configured to send a panel ID request to building equipment 510 using the YorkTalk 3 communications protocol. YorkTalk 3 uses a full-duplex RS-232 link to pass data between equipment port 506 and building equipment 510. The following table illustrates the elements of a YorkTalk 3 message:

| Byte # | Element | Designation | Value/Range | Encoded Range |
|---|---|---|---|---|
| 1 | Header | Message Start (STX) | 0x02 | |
| 2 | | Message Command | 0x00-0x7F | 0x80-0xFF |
| 3 | | Message Number | | |
| 4-(4 + N) | Body | Message Data | 0x00-0xFF | 0x00, 0x01, 0x04-0xFF |
| 5 + N | Tail | Checksum (Low Byte) | 0x00-0xFF | 0x80-0xFF |
| 6 + N | | Checksum (High Byte) | | |
| 7 + N | | Message End (ETX) | 0x02 | |

The header of a YorkTalk 3 message is shown to include a "message start" tag, a "message command," and a "message number." The body of a YorkTalk 3 message is shown to include a "message data." The message data may be the portion of the message that includes the panel ID request. The tail of a YorkTalk 3 message is shown to include "checksum" parameters and a "message end" tag.

YorkTalk 3 ACO 628 may send a message to building equipment 510 using the YorkTalk 3 protocol. The message may request the panel ID of building equipment 510. If building equipment 510 is configured to communicate using the YorkTalk 3 protocol, building equipment 510 may reply to the panel ID request with a response message. YorkTalk 3 ACO 628 may determine whether the response message complies with the YorkTalk 3 communications protocol. For example, YorkTalk 3 ACO 628 may determine whether the response message has the expected format, the expected number of parameters, the expected type of parameters, or other attributes that identify the response message as a YorkTalk 3 message. If the response message complies with the YorkTalk 3 protocol, YorkTalk 3 ACO 628 may inform autoconfiguration manager 610 that YorkTalk 3 is the correct communications protocol for equipment port 506.

YorkTalk 3 ACO 628 may extract one or more attributes from the YorkTalk 3 response message and use the extracted attributes to identify building equipment 510. For example, YorkTalk 3 ACO 628 may identify the type, name, model, version, or other attributes of building equipment 510 based on the attributes extracted from the YorkTalk 3 response message. YorkTalk 3 ACO 628 may provide the identity of building equipment 510 to equipment model manager 612.

Still referring to FIG. 6, smart communications controller 502 is shown to include an equipment model manager 612. Equipment model manager 612 may be configured to select an equipment model for building equipment 510 based on the identity of building equipment 510. Equipment model manager 612 is shown receiving the equipment name/ID from ACOs 620. Equipment model manager 612 use the equipment name/ID to identify and retrieve a corresponding equipment model from equipment model database 614.

Equipment model database 614 may include any number of equipment model (e.g., database) packages available to controller 502. In some embodiments, equipment model database 614 is a portion of the local memory of controller 502 (e.g., serial flash). Additional equipment model packages can be downloaded over a communications network (e.g., a LAN, the Internet) and/or provided by a removable storage device (e.g., a USB stick) to allow equipment model database 614 to be expanded to support additional equipment models or protocols.

In some embodiments, equipment model manager 612 generates an attribute table based on the content of equipment model database 614. The attribute table may indicate the number of equipment models available in equipment model database 614 and may include a list of the available equipment models. Equipment model manager 612 may be configured to scan equipment model database 614 upon startup and may populate the attribute table with information describing the equipment models stored in equipment model database 614.

Equipment model manager 612 may populate the attribute table with information identifying the building equipment to which each of the stored equipment models pertains. For example, one of the equipment models may be a model for a first type of chiller (or other type of building equipment) having a particular manufacturer, model number, or device ID, whereas another of the equipment models may be a model for a second type of chiller (or other type of building equipment) having a different manufacturer, model number, or device ID. Equipment model manager 612 may be configured to populate the attribute table with an attribute or property identifying a particular type of building equipment associated with each equipment model. When an equipment name/ID is received from ACOs 620, equipment model manager 612 may use the attribute table to identify and select a corresponding equipment model. Equipment model manager 612 may select an equipment model and provide the selected equipment model to equipment controller 618.

Still referring to FIG. 6, smart communications controller 502 is shown to include an equipment controller 618. Equipment controller 618 may be configured to control building equipment 510 using the selected equipment model. In various embodiments, equipment controller 618 may use closed loop control, open loop control, feedback control, feed-forward control, PI control, model predictive control, or any other type of automated building control methodology that relies on an equipment model to translate an input into an output. In some embodiments, the output is a control signal for building equipment 510 (e.g., dampers, air handling units, chillers, boilers, fans, pumps, etc.) that operate to affect a variable state or condition (e.g., temperature, humidity, air flow rate, etc.) within a building space.

Equipment controller 618 may receive inputs from building equipment 510, sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other systems or devices via equipment port 506, BAS port 504, and/or communications interface 508. Equipment controller 618 may apply the various inputs to the selected equipment model to determine an output for building equipment 510. Equipment controller 618 may operate building equipment 510 maintain building conditions within a setpoint range, to optimize energy performance (e.g., to minimize energy consumption, to minimize energy cost, etc.), and/or to satisfy any constraint or combination of constraints as may be desirable for various implementations.

Still referring to FIG. 6, smart communications controller 502 is shown to include an attribute mapping database 616. Attribute mapping database 616 may act as a configuration data store for the various mappings used by controller 502 to support the protocols used by ACOs 620 and equipment controller 618. For example, attribute mapping database 616 may store mappings that associate particular attributes used by ACOs 620 and/or equipment controller 618 with particular attributes of protocol-specific messages exchanged between controller 502 and external systems or devices.

ACOs 620 are shown receiving protocol-specific attribute mappings from attribute mapping database 616. ACOs 620 may use the protocol-specific attribute mappings to properly interpret messages received from external systems or devices using a particular communications protocol. For example, ACOs 620 may use the protocol-specific attribute mappings to identify and extract the equipment name/ID from response messages received from building equipment 510. ACOs 620 may use the protocol-specific attribute mappings to generate messages that can be sent to external systems or devices using a particular communications protocol.

Equipment controller 618 is also shown receiving the protocol-specific attribute mappings from attribute mapping database 616. Equipment controller 618 may use the protocol-specific attribute mappings to identify a particular variable for which a value is specified in a message received from an external data source. For example, equipment controller 618 may read the attribute values of messages received from building equipment 510. Equipment controller 618 may use the attribute mappings to associate the attribute values with a particular variable that is used in the selected equipment model. Equipment controller 618 may generate a control signal for building equipment 510 and use the attribute mappings to convert the control signal into a protocol-specific control signal for building equipment 510.

In some embodiments, attribute mapping database 616 includes attribute mappings for each of the communications protocols used by smart communications controller 502. The following table illustrates exemplary attribute mappings for the Modbus Slave, N2 Slave, Modbus Master, and YorkTalk protocols.

| Attribute Name | Protocol-Specific Attributes | Corresponding Attributes |
| --- | --- | --- |
| Supported Equipment | STRING_DATA_TYPE | ModelName |
| | ENUM_DATA_TYPE | ModelID |
| Modbus Slave | BAC_OID_DATA_TYPE | bacOID |
| | ENUM_DATA_TYPE | attribute |
| | USHORT_DATA_TYPE | modbusAddress |
| | ENUM_DATA_TYPE | modbusScalingFactor |
| | BOOL_DATA_TYPE | modbusBooleanFlag |
| | BOOL_DATA_TYPE | modbusSignedFlag |
| | BOOL_DATA_TYPE | modbusWriteableFlag |
| N2 Slave | BAC_OID_DATA_TYPE | bacOID |
| | ENUM_DATA_TYPE | attribute |
| | ENUM_DATA_TYPE | networkPointType |
| | USHORT_DATA_TYPE | networkPointAddress |
| Modbus Master | BAC_OID32 | bacOID |
| | UNSIGNED16 | attribute |
| | UNSIGNED32 | pointMapperOid |
| | UNSIGNED16 | pointMapperClassID |
| | UNSIGNED8 | pointWriteable |
| | FLOAT32 | pointMinValue |
| | FLOAT32 | pointMaxValue |
| | FLOAT32 | pointIncValue |
| | UNSIGNED32 | pointRefreshRate |
| | UNSIGNED16 | pointUnitsType |
| | UNSIGNED16 | pointDispPrecision |
| | UNSIGNED16 | pointNumOfStatesAttr |
| | UNSIGNED16 | pointStatesTextAttr |
| | UNSIGNED16 | modbusAddress |
| | UNSIGNED16 | modbusScalingFactor |
| | UNSIGNED8 | modbusBooleanFlag |
| | UNSIGNED8 | modbusSignedFlag |
| | FLOAT32 | modbusOffset |
| | UNSIGNED8 | modbusWriteableFlag |
| | UNSIGNED16 | modbusFunction |
| YorkTalk | BAC_OID32 | bacOID |
| | UNSIGNED16 | attribute |
| | UNSIGNED32 | pointMapperOid |
| | UNSIGNED16 | pointMapperClassID |
| | UNSIGNED8 | pointWriteable |
| | FLOAT32 | pointMinValue |
| | FLOAT32 | pointMaxValue |
| | FLOAT32 | pointIncValue |
| | UNSIGNED32 | pointRefreshRate |
| | UNSIGNED16 | pointUnitsType |
| | UNSIGNED16 | pointDispPrecision |
| | UNSIGNED16 | pointNumOfStatesAttr |
| | UNSIGNED16 | pointStatesTextAttr |
| | UNSIGNED8 | ytObjectType |
| | UNSIGNED8 | ytDataType |
| | UNSIGNED8 | ytInputInstanceID |
| | UNSIGNED8 | ytOutputInstanceID |
| | UNSIGNED8 | ytProperty |
| | UNSIGNED8 | ytIndex |
| | UNSIGNED8 | yt2TargetNode |
| | UNSIGNED16 | ytConvTableIndex |

The supported equipment list attribute may specify the model name, model ID, or other identifier of the building equipment 510 or BAS network 526 to which the mapping information pertains. The Modbus Slave mapping information includes protocol-specific attributes of messages sent or received by a BAS network using the Modbus Slave protocol and the corresponding attributes used by smart communications controller 502. Similarly, the N2 Slave mapping information includes protocol-specific attributes of messages sent or received by a BAS network using the Modbus Slave protocol and the corresponding attributes used by smart communications controller 502. The Modbus Master mapping information includes protocol-specific attributes of messages sent or received by building equipment using the Modbus Master protocol and the corresponding attributes used by smart communications controller 502. Similarly, the YorkTalk mapping information includes protocol-specific attributes of messages sent or received by building equipment using the YorkTalk protocol and the corresponding attributes used by smart communications controller 502. ACOs 620 and equipment controller 618 may use the attribute mappings provided by attribute mapping database 616 to extract information from protocol-specific messages, generate messages that comply with a particular protocol, and/or translate messages between various communications protocols.

In some embodiments, ACOs 620 use the attribute mappings to identify the protocol used by a particular port or interface. For example, a message may be received at equipment port 506 in an unknown protocol. ACOs 620 may scan all of the attributes of the message and compare the attributes to the various sets of attributes listed in attribute mapping database 616. If the attributes of the message match the attributes listed in attribute mapping database 616 for a particular protocol, ACOs 620 may determine that the protocol corresponding to the matching attributes is correct for equipment port 506. In some embodiments, this technique is performed by one or more of the ACOs 620 for which the corresponding protocol does not support sending a device ID request. The same or similar technique may be used to identify the communications protocol for BAS port 504 and/or communications interface 508.

Autoconfiguration Process

Figure 7:
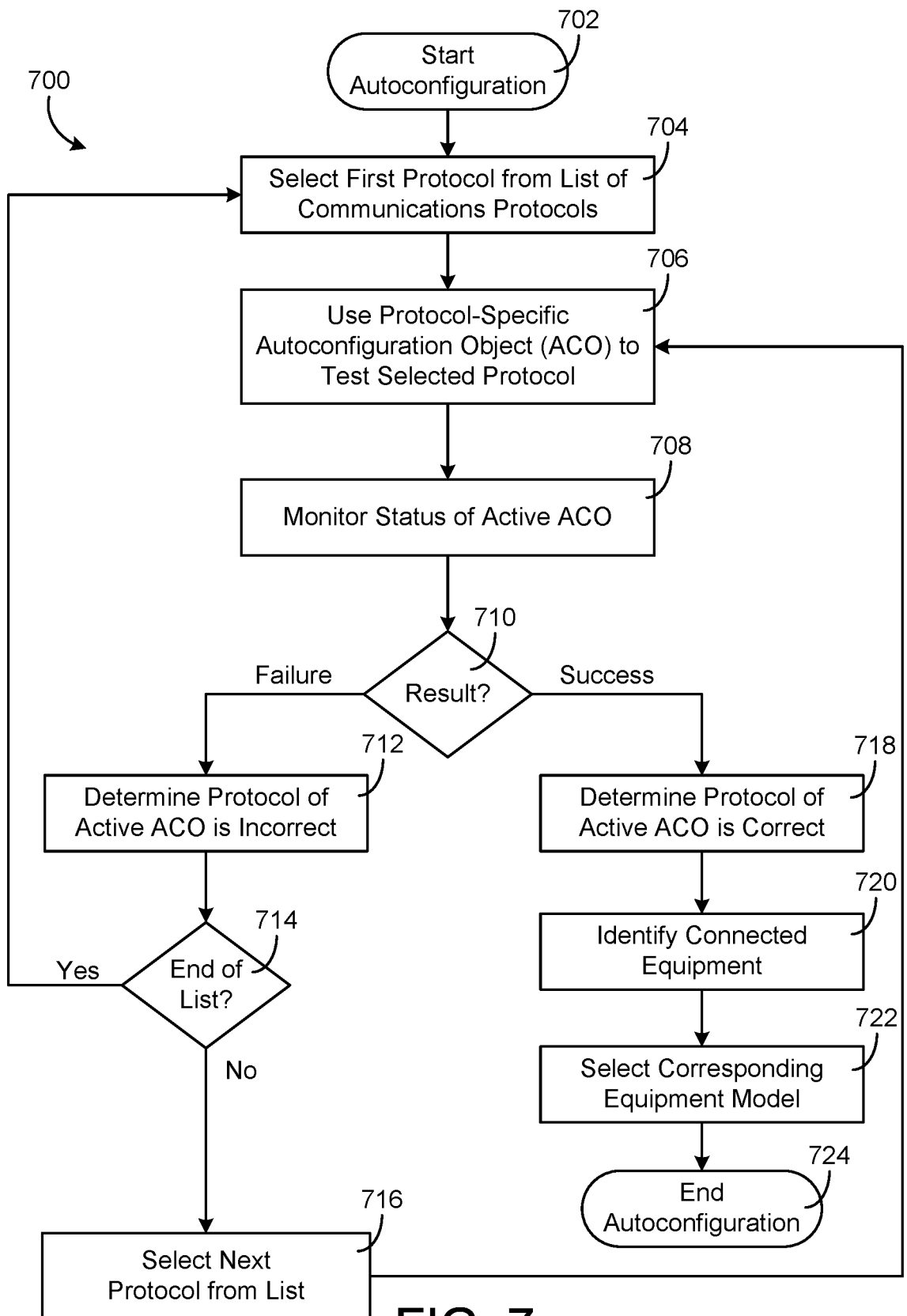
FIG. 7 is a flowchart of a process for automatically configuring the smart communications controller of FIG. 5 to use a particular communications protocol and equipment model for controlling the connected building equipment, according to an exemplary embodiment.

Referring now to FIG. 7, a flowchart of a process 700 for automatically configuring a controller for building equipment is shown, according to an exemplary embodiment.

Process 700 may be performed by smart communications controller 502 to automatically detect the correct communications protocols for one or more of ports 504-508, automatically identify the equipment connected to ports 504-508, and automatically select an appropriate equipment model for the connected equipment.

Process 700 is shown to include starting the autoconfiguration process (step 702). In some embodiments, step 702 is performed in response to a request from a user to initiate the autoconfiguration process. In other embodiments, step 702 may be performed automatically or periodically. For example, step 702 may be performed upon startup or in response to connecting one or more of ports 504-508 to an external system or device. In some embodiments, step 702 is performed in response to a determination that one or more of ports 504-508 has been connected to an external communications network 446, a BAS network 526, and/or to building equipment 510.

In some embodiments, step 702 includes initializing the autoconfiguration process. Initializing the autoconfiguration process may include receiving one or more port identifiers. The port identifiers may indicate the ports and interfaces of controller 502 for which process 700 will be performed. In some embodiments, a separate instance of process 700 is performed for each of the ports of controller 502. Separate instances of process 700 may be performed in parallel (e.g., by separate instances of autoconfiguration manager 610) or in series (e.g., by the same instance of autoconfiguration manager 610). In other embodiments, a single instance of process 700 is performed to automatically configure multiple ports of controller 502.

Process 700 is shown to include selecting a first protocol from a list of communications protocols (step 704). The list of communications protocols may be maintained by autoconfiguration manager 610 and may include a plurality of protocols that smart communications controller 502 is configured to automatically detect. In some embodiments, the list of communications protocols specifies a protocol-specific autoconfiguration object (ACO) (i.e., one of ACOs 620) for each of the protocols. For example, the list of communications protocols may be the ACO scan list, as described with reference to FIG. 6. The list may be received from an external data source or generated by autoconfiguration manager 610 based on the ACOs 620 stored in memory 608.

Process 700 is shown to include using a protocol-specific ACO to test the selected protocol (step 706). Step 706 may include activating the ACO that corresponds to the selected protocol and allowing the active ACO control the port(s) specified in step 702. Step 706 may include allowing the active ACO to send and receive messages via the specified port(s) to determine whether the selected protocol is correct for the specified port(s). Step 706 may be accomplished using any of a variety of techniques based on which of the ACOs is currently active. For example, some ACOs (e.g., Modbus Master ACO 622, YorkTalk 2 ACO 626, and YorkTalk 3 ACO 628) may send a device ID request to the connected equipment and monitor the specified port(s) for a response message. The active ACO may then analyze the response message to determine whether the response message complies with the selected protocol. Other ACOs may monitor the specified port(s) without first sending a device ID request. The active ACO may then compare a set of attributes received via the specified port(s) with various sets of attributes provided by an attribute mapping database. If a match is found, the active ACO may determine that the matching protocol is correct for the specified port(s). Step 706 is described in greater detail with reference to FIG. 8.

Still referring to FIG. 7, process 700 is shown to include monitoring the status of the active ACO (step 708) and determining a result of the protocol testing process (step 710). In some embodiments, step 708 includes monitoring an autoconfiguration status attribute of the active ACO. For example, step 708 may include subscribing to a change in value (COV) notification for the autoconfiguration status attribute. When the autoconfiguration status attribute changes, the change may be reported to autoconfiguration manager 610. In some embodiments, the autoconfiguration status attribute has a value of "pending" while step 706 is being performed, but no outcome has been determined. The autoconfiguration status attribute may change to "success" if the outcome of the protocol testing is successful (i.e., the tested protocol is correct for the specified port) or "failure" if the outcome of the protocol testing is unsuccessful (i.e., the tested protocol is not correct for the specified port). Step 710 may include determining that the result of the protocol testing is successful in response to the autoconfiguration status attribute changing to "success" and unsuccessful in response to the autoconfiguration status attribute changing to failure.

Process 700 is shown to include determining that the protocol of the active ACO is incorrect (step 712). Step 712 may be performed in response to a determination in step 710 that the protocol test is unsuccessful (i.e., the result of step 710 is "failure") for the selected communications protocol. In some embodiments, step 712 is performed in response to the active ACO reporting a failure. Once the selected protocol has been determined to be incorrect, process 700 may proceed to determining whether the selected protocol is the last protocol in the list (step 714).

If the selected protocol is not the last protocol in the list (i.e., the result of step 714 is "no"), process 700 may proceed to selecting the next protocol in the list (step 716) and may return to step 706. Steps 706-716 may be repeated iteratively for each protocol in the list until one of the ACOs reports a success (i.e., the result of step 710 is "success") or until the end of the list is reached (i.e., the result of step 714 is "yes"). If the selected protocol is the last protocol in the list (i.e., the result of step 714 is "no"), process 700 may return to step 704. Steps 704-716 may be repeated until one of the ACOs reports a success (i.e., the result of step 710 is "success").

Process 700 is shown to include determining that the protocol of the active ACO is correct (step 718). Step 718 may be performed in response to a determination in step 710 that the protocol test is successful (i.e., the result of step 710 is "success") for the selected communications protocol. In some embodiments, step 718 is performed in response to the active ACO reporting a success. Once the selected protocol has been determined to be correct, process 700 may proceed to identifying the connected equipment (step 720) and selecting the corresponding equipment model for the connected equipment (step 722). Steps 720 and 722 are optional steps and may be performed in any order following step 718.

In some embodiments, step 720 includes extracting the equipment name/ID from a response message received from the connected equipment. Protocol-specific attribute mappings from attribute mapping database 616 may be used in step 720 to identify the attributes of the response message that correspond to the equipment name/ID. In other embodiments, step 720 includes comparing the available equipment attributes in the response message with a set of attribute mappings in attribute mapping database 616. For example, attribute mapping database 616 may include multiple sets of attribute mappings, each of which corresponds to a particular communications protocol and/or a particular equipment type. If the attributes in the response message match one of the sets of attribute mappings in attribute mapping database 616, step 720 may include identifying the connected equipment as the same type of equipment specified in the matching attribute mapping.

Step 722 may include selecting an equipment model corresponding to the identified equipment from an equipment model database 614. The selected equipment model may be provided to equipment controller 618 and used by equipment controller 618 to control the connected equipment. In some embodiments, step 722 includes selecting a set data mappings that facilitate conversion between the native protocols of the connected systems or devices and/or the protocol used by controller 502. Advantageously, performing step 722 may allow controller 502 to act as a seamless gateway between two systems running different protocols. Once steps 720 and/or 722 are performed, the autoconfiguration process may end (step 724).

As previously mentioned, process 700 may be a multi-stage autoconfiguration process. For example, process 700 may include a protocol detection stage (steps 704-718), an equipment identification stage (step 720), and an equipment model/data mapping selection stage (step 722). Steps 720 and 722 may be performed or not performed based on any of a variety of criteria including, for example, the type of port or interface for which process 700 is performed (e.g., equipment port 506, BAS port 504, communications interface 508) and/or the identity of the active ACO. In some embodiments, the protocol detection stage is performed by each of ACOs 620 for each type of port. The equipment identification stage and equipment model selection stage may be optional stages performed in any order after the protocol detection stage successfully completes.

The following tables identify particular combinations of ports and ACOs for which each of the stages of process 700 may be performed, according to an exemplary embodiment. However, it should be understood that these tables are merely exemplary and that the various stages of process 700 may be performed for different combinations of ports and ACOs in other embodiments.

| Equipment Port 506 | | | |
| --- | --- | --- | --- |
| ACOs/Protocols | Automatic Protocol Detection | Automatic Equipment Identification | Automatic Equipment Model/Data Mapping Selection |
| Yorktalk3 Master | Yes | Yes | Yes |
| Yorktalk2 Master | Yes | Yes | Yes |
| Modbus Master | Yes | Yes | Yes |
| MSTP Master (Wired) | Yes | Yes | No |
| MSTP Master (Wireless/Zigbee) | Yes | Yes | No |

| BAS Port 504 | | | |
| --- | --- | --- | --- |
| ACOs/Protocols | Automatic Protocol Detection | Automatic Equipment Identification | Automatic Equipment Model/Data Mapping Selection |
| N2 Slave | Yes | No | Yes |
| Modbus Slave | Yes | No | Yes |
| MSTP Master (Wired) | Yes | No | No |
| MSTP Master (Wireless/Zigbee) | Yes | No | No |

| Communications Interface 508 | | | |
| --- | --- | --- | --- |
| ACOs/Protocols | Automatic Protocol Detection | Automatic Equipment Identification | Automatic Equipment Model/Data Mapping Selection |
| MSTP Master (Wired) | Yes | No | No |
| MSTP Master (Wireless/Zigbee) | Yes | No | No |

Protocol Testing Process

Figure 8:
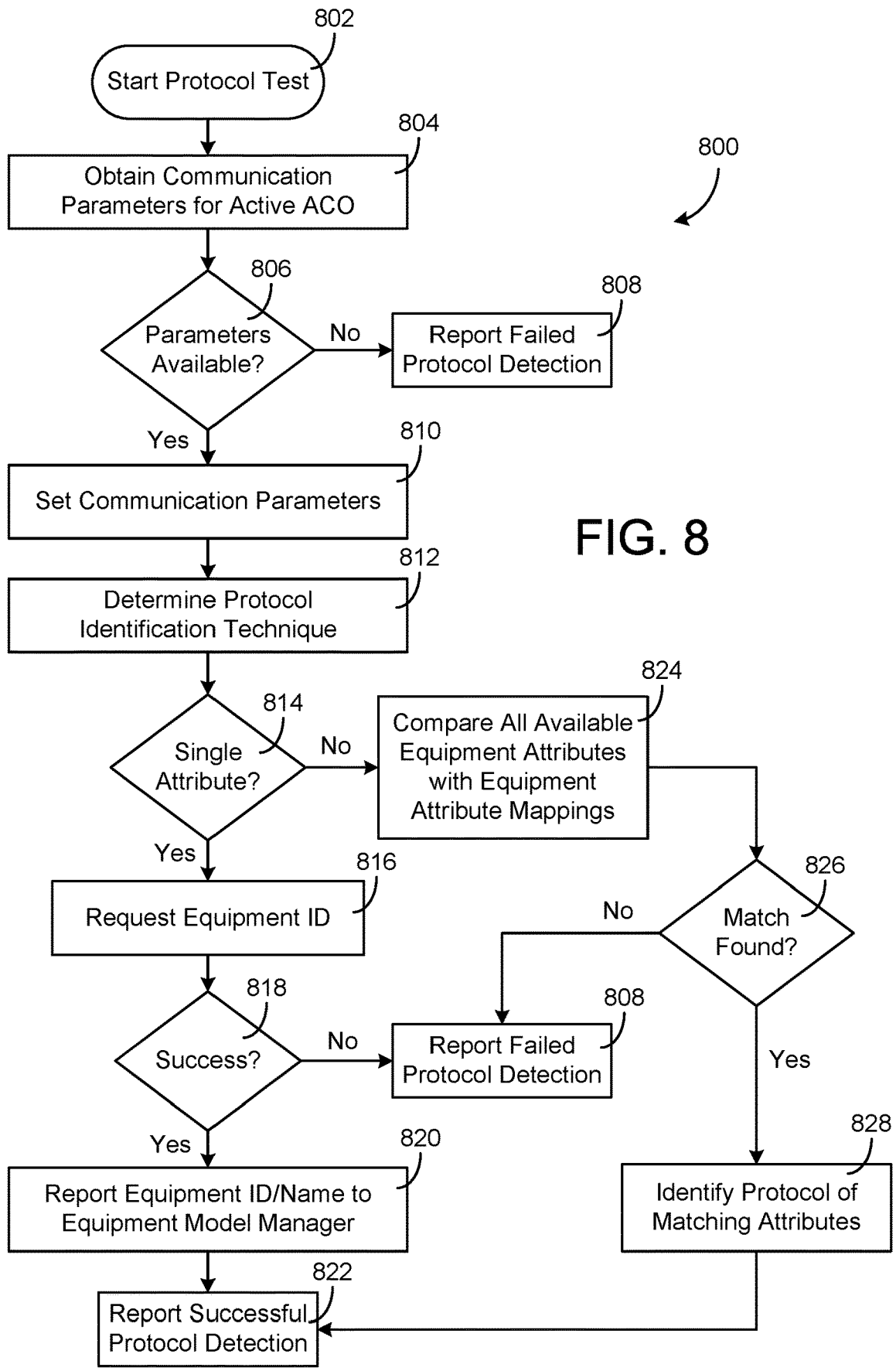
FIG. 8 is a flowchart of a process for automatically testing a communications protocol, which may be performed by the smart communications controller of FIG. 5, according to an exemplary embodiment.

Referring now to FIG. 8, a flowchart of a protocol testing process 800 is shown, according to an exemplary embodiment. Process 800 may be performed by smart communications controller 502 to determine whether a selected communications protocol is correct for a specified port or interface. In some embodiments, process 800 is performed by ACOs 620, as described with reference to FIG. 6. Particularly, process 800 may be performed by whichever ACO is currently active in order to test the protocol associated with the active ACO. In some embodiments, process 800 is used to accomplish step 706 of process 700.

Process 800 is shown to include starting the protocol testing process (step 802). In some embodiments, step 802 is performed in response to a request from a user to initiate the protocol testing process. In other embodiments, step 802 may be performed automatically. For example, step 802 may be performed in response to process 700 proceeding to step 706. Process 800 may be automatically initiated each time process 700 requires that step 706 be performed.

Process 800 is shown to include obtaining communication parameters for the active ACO (step 804). The communication parameters may be ACO-specific configuration parameters obtained from device storage (e.g., the ACO scan list) and provided to the active ACO as initialization data. In some embodiments, the communication parameters include the OID of autoconfiguration manager 610, the ACO protocol identifier, the ACO's initialization table pointer, the size of persistent data, persistence information (if available) for the selected ACO from the stored persistence file, and/or an indication of which port(s) or interface(s) should be tested by the ACO.

Process 800 is shown to include determining whether the communication parameters are available (step 806). If the communication parameters are not available (i.e., the result of step 806 is "no"), process 800 may report that the protocol detection has failed (step 808) and process 800 may end. However, if the communication parameters are available (i.e., the result of step 806 is "yes"), process 800 may set the communication parameters (step 810). Setting the communication parameters may include configuring the active ACO to use the communication parameters. Step 810 may include configuring the ACO to test a particular port or interface using a particular communications protocol.

In some embodiments, step 810 includes simulating the startup sequence provided by the runtime environment for the ACO. Simulating the startup sequence may include performing one or more startup routines for the ACO. These startup routines may be recorded in a startup table for the ACO and may include, for example, general startup procedures, enabling communications, starting inputs, restarting logic, starting features, and enabling field communications. In some embodiments, step 810 includes repeating any of the startup routines that have not completed until process 800 ends.

Still referring to FIG. 8, process 800 is shown to include determining the protocol identification technique (step 812).

The protocol identification technique may be an attribute of the ACO and/or specified by the communication parameters set in step 810. The protocol detection technique is not an attribute or classification of the building equipment, but rather indicates the type of protocol detection performed by the ACO. For example, the protocol identification technique may indicate whether the ACO is configured to identify the building equipment using a single-attribute identification technique or a multi-attribute identification technique.

Process 800 is shown to include determining whether the protocol identification technique is a single-attribute identification technique (step 814). If the protocol identification technique is a single-attribute identification technique (i.e., the result of step 814 is "yes"), process 800 may proceed to requesting the equipment ID from the connected equipment (step 816). The equipment ID may be requested by sending a protocol-specific message to the connected equipment using the tested communications protocol. If the equipment is configured to communicate using the tested protocol, the equipment may reply with a response message that includes the equipment ID. The response message may be received in the tested communications protocol.

Process 800 is shown to include determining whether the equipment ID request is successful (step 818). Step 818 may include determining that the equipment ID request is successful if a response message is successfully received from the connected equipment. If the equipment ID request is successful (i.e., the result of step 816 is "yes"), process 800 may include reporting the equipment ID or equipment name to equipment model manager 612 (step 820) and reporting that the result of the protocol detection is successful to autoconfiguration manager 610 (step 822). However, if the equipment ID request is unsuccessful (i.e., the result of step 816 is "no"), process 800 may include reporting that the protocol detection has failed (step 808). Once the protocol detection process has been reported as either successful or failed, process 800 may end.

Returning to step 814, if the protocol identification technique is not a single-attribute identification technique (i.e., the result of step 814 is "no"), process 800 may proceed to comparing all available equipment attributes with equipment attribute mappings (step 824). Step 824 may include comparing the equipment attributes included in a response message from the connected equipment with a set of protocol-specific equipment attributes for each of a plurality of communications protocols. The protocol-specific equipment attributes may be extracted from a set of attribute mappings stored in attribute mapping database 616. For example, attribute mapping database 616 may include sets of protocol-specific attribute mappings for various communications protocols that can be detected by controller 502. Each set of attribute mappings may define a set of equipment attributes that are typically included in messages formatted according to a particular protocol.

Process 800 is shown to include determining whether the available equipment attributes in the response message match any of the sets of equipment attribute mappings (step 826). If a match is not found (i.e., the result of step 826 is "no"), process 800 may include reporting that the protocol detection has failed (step 808). However, if a match is found (i.e., the result of step 826 is "yes"), process 800 may proceed to identifying the protocol of the matching attributes (step 828). The protocol of the matching attributes may specified as a property of the set of equipment attribute mappings in attribute mapping database 616. Step 828 may include identifying a set of equipment attribute mappings in attribute mapping database that match the equipment attributes in the response message. The protocol associated with the equipment attribute mappings may be retrieved from attribute mapping database 616 and identified as the correct protocol for the port. Once the protocol of the matching attributes is identified, process 800 may report that the result of the protocol detection is successful (step 822).

Equipment Model Selection Process

Figure 9:
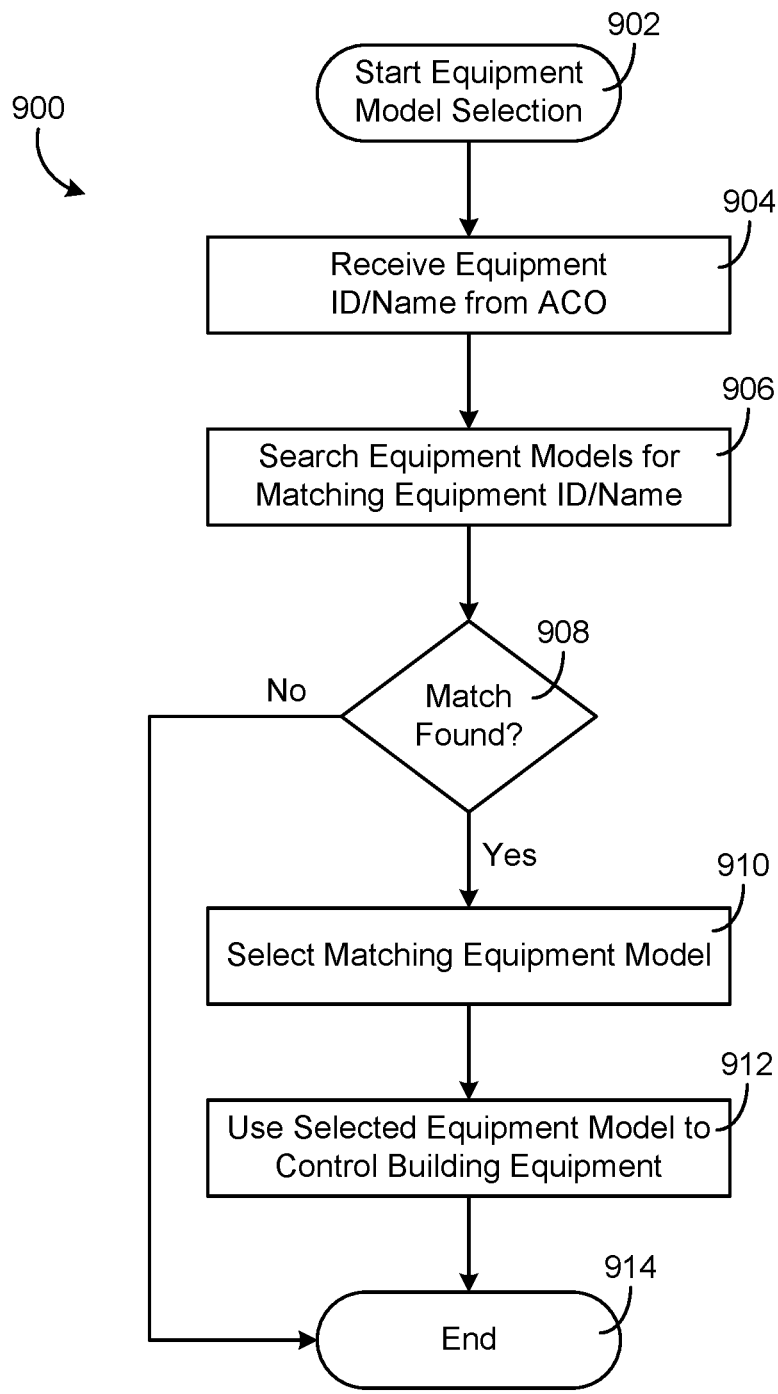
FIG. 9 is a flowchart of a process for selecting an equipment model, which may be performed by the smart communications controller of FIG. 5, according to an exemplary embodiment.

Referring now to FIG. 9, a flowchart of an equipment model selection process 900 is shown, according to an exemplary embodiment. Process 900 may be performed by smart communications controller 502 to select an equipment model for the equipment connected to a specified port or interface. In some embodiments, process 900 is performed by equipment model manager 612, as described with reference to FIG. 6. Process 900 may be used to accomplish step 722 of process 700.

Process 900 is shown to include starting the equipment model selection process (step 902). In some embodiments, step 902 is performed in response to a request from a user to initiate the equipment model selection process. In other embodiments, step 902 may be performed automatically. For example, step 902 may be performed in response to process 700 proceeding to step 722. Process 900 may be automatically initiated each time process 700 requires that step 722 be performed.

Process 900 is shown to include receiving an equipment ID or name from an ACO (step 904). The equipment ID or name may be provided as an attribute of a response message received from the connected equipment. In some embodiments, step 904 includes accessing attribute mapping database 616 to determine which of the attributes of the response message corresponds to the equipment ID or name.

Process 900 is shown to include searching equipment models for a matching equipment ID or name (step 906). Step 906 may include searching the equipment models stored in equipment model database 614 for an equipment model that applies to the particular type of equipment identified by the equipment ID or name received in step 904. In some embodiments, step 906 includes searching an attribute table based on the content of equipment model database 614. The attribute table may indicate the number of equipment models available in equipment model database 614, a list of the available equipment models, and information describing each of the equipment models. In some embodiments, the information in the attribute table indicates one or more equipment IDs and/or equipment names to which the equipment model pertains.

Process 900 is shown to include determining whether a matching equipment model is found (step 908). If a matching equipment model is not found (i.e., the result of step 908 is "no"), process 900 may end (step 914). However, if a matching equipment model is found (i.e., the result of step 908 is "yes"), process 900 may proceed to selecting the matching equipment model (step 910). The selected equipment model may be provided to equipment controller 618 and used by equipment controller 618 to control the connected building equipment (step 912).

YorkTalk Configuration Process

Figure 10:
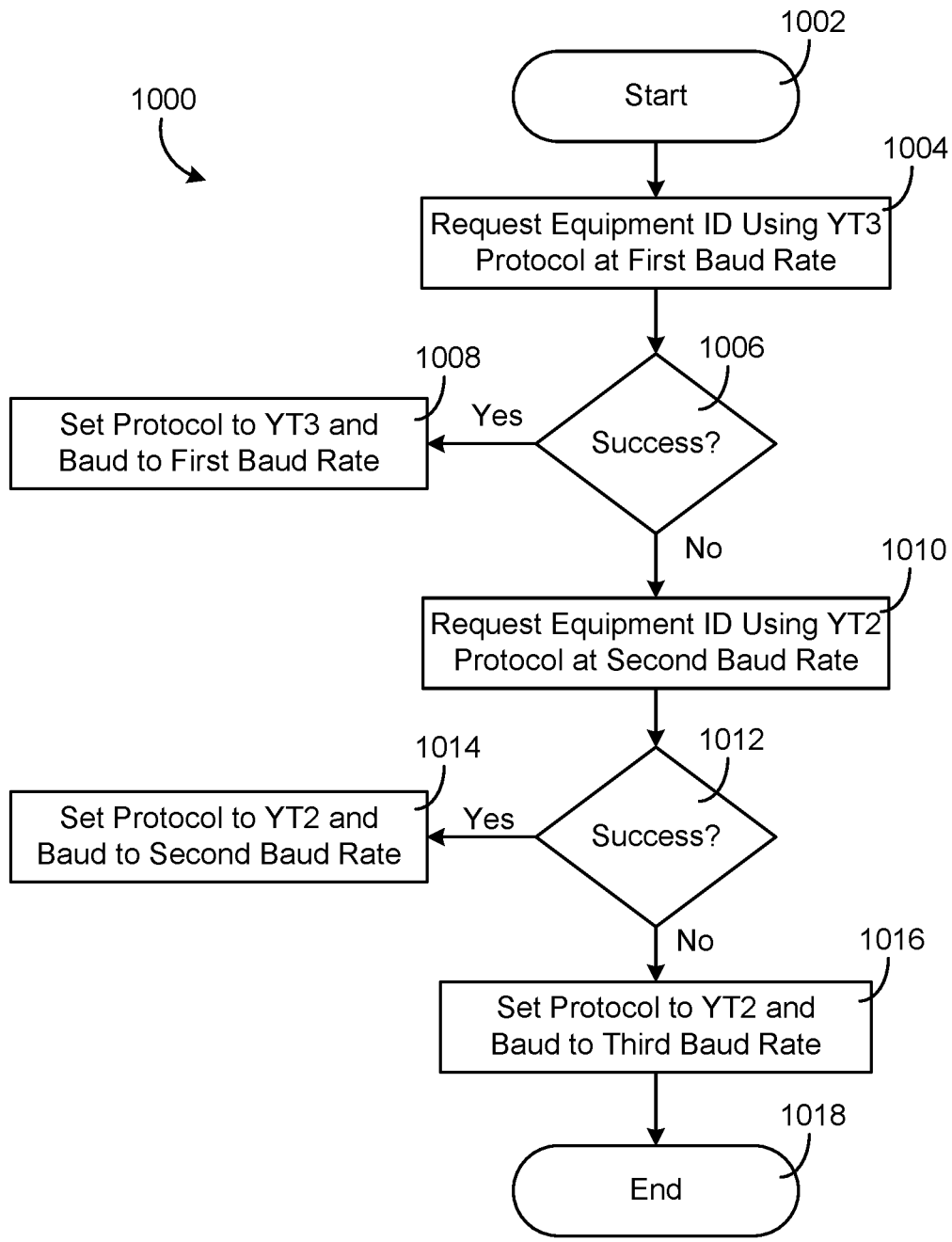
FIG. 10 is a flowchart of another process for automatically testing a communications protocol, which may be performed by the smart communications controller of FIG. 5, according to an exemplary embodiment.

Referring now to FIG. 10, a flowchart of another protocol testing process 1000 is shown, according to an exemplary embodiment. Process 1000 may be performed by smart communications controller 502 to determine whether a selected communications protocol is correct for a specified port or interface. In some embodiments, process 1000 is performed by ACOs 620, as described with reference to FIG. 6. Particularly, process 1000 may be performed by YorkTalk 2 ACO 626 and/or YorkTalk 3 ACO 628 to test whether either of the YorkTalk protocols are correct. In some embodiments, process 1000 is used to accomplish step 706 of process 700.

Process 1000 is shown to include starting the protocol testing process (step 1002). In some embodiments, step 1002 is performed in response to a request from a user to initiate the protocol testing process. In other embodiments, step 1002 may be performed automatically. For example, step 1002 may be performed in response to process 700 proceeding to step 706 when the YorkTalk ACOs 626-628 are active.

Process 1000 is shown to include requesting the equipment ID using the YorkTalk 3 (YT3) protocol at a first baud rate (step 1004). In some embodiments, the first baud rate is approximately 19200 Bd. If the equipment is configured to communicate using the YT3 protocol and the first baud rate, the equipment may reply with a response message that includes the equipment ID. Process 1000 may include determining whether a response message is successfully received in response to the equipment ID request (step 1006). If a response message is successfully received (i.e., the result of step 1006 is "yes"), process 1000 may proceed to setting the active protocol to YT3 and the baud to the first baud rate (step 1008). However, if a response message is not successfully received (i.e., the result of step 1006 is "no"), process 1000 may proceed to step 1010.

Process 1000 is shown to include requesting the equipment ID using the YorkTalk 2 (YT2) protocol at a second baud rate (step 1010). In some embodiments, the second baud rate is approximately 4800 Bd. If the equipment is configured to communicate using the YT2 protocol and the second baud rate, the equipment may reply with a response message that includes the equipment ID. Process 1000 may include determining whether a response message is successfully received in response to the equipment ID request (step 1012). If a response message is successfully received (i.e., the result of step 1012 is "yes"), process 1000 may proceed to setting the active protocol to YT2 and the baud to the second baud rate (step 1014). However, if a response message is not successfully received (i.e., the result of step 1012 is "no"), process 1000 may proceed to setting the active protocol to YT2 and the baud to a third baud rate (step 1016). In some embodiments, the third baud rate is approximately 1200 Bd. Process 1000 may then end (step 1018).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A smart communications controller for building equipment, the smart communications controller comprising:
   an equipment port connected to the building equipment; and
   a processing circuit comprising a plurality of autoconfiguration objects, each of the autoconfiguration objects corresponding to a different communications protocol and configured to perform a protocol testing process, wherein the processing circuit is configured to select a protocol identification technique based on whether a tested communications protocol supports sending a request for an equipment ID to the building equipment and wherein the protocol identification technique comprises:
      sending a request message to the building equipment using the corresponding communications protocol, the request message comprising the request for the equipment ID;
      if a response message including the requested equipment ID is received, identifying the corresponding communications protocol as being used by the building equipment; and
      if either (1) the response message from the building equipment is not received or (2) the response message from the building equipment that does not include the requested equipment ID is received, identifying the corresponding communications protocol as not being used by the building equipment;
   the processing circuit comprising an equipment controller configured to use the identified communications protocol to generate protocol-specific control signals for the building equipment and operate the building equipment to affect a variable state or condition within a building.

2. The smart communications controller of claim 1, wherein:
the plurality of autoconfiguration objects are configured to perform an equipment identification process after the communications protocol used by the building equipment is identified; and
the equipment identification process uses the identified communications protocol to identify the building equipment connected to the equipment port.

3. The smart communications controller of claim 2, the processing circuit further comprising an equipment model manager configured to receive an identity of the building equipment from the autoconfiguration objects and to use the identity of the building equipment to select an equipment model for the building equipment.

4. The smart communications controller of claim 1, the processing circuit comprising an autoconfiguration manager configured to cause the autoconfiguration objects to iteratively perform their protocol testing processes until the communications protocol used by the building equipment is identified.

5. The smart communications controller of claim 4, wherein:
each of the plurality of autoconfiguration objects is configured to report a result of the protocol testing process to the autoconfiguration manager;
the autoconfiguration manager is configured to terminate a first protocol testing process performed by a first autoconfiguration object in response to the first autoconfiguration object reporting a successful result of the first protocol testing process; and
the autoconfiguration manager is configured to cause a second autoconfiguration object to initiate a second protocol testing process in response to the first autoconfiguration object reporting an unsuccessful result of the first protocol testing process.

6. The smart communications controller of claim 4, wherein the autoconfiguration manager is configured to:
maintain a list of the autoconfiguration objects;
determine whether a currently-active autoconfiguration object is a last autoconfiguration object in the list;
if the currently-active autoconfiguration object is not the last autoconfiguration object in the list, cause a next autoconfiguration object in the list to initiate a next protocol testing process in response to the currently-active autoconfiguration object reporting an unsuccessful result of the protocol testing process; and
if the currently-active autoconfiguration object is the last autoconfiguration object in the list, cause a first autoconfiguration object in the list to initiate a first protocol testing process in response to the currently-active autoconfiguration object reporting the unsuccessful result of the protocol testing process.

7. The smart communications controller of claim 4, wherein the autoconfiguration manager is configured to:
determine which of the autoconfiguration objects most recently reported a successful result of the protocol testing process;
prior to a device reboot, store an indication of the autoconfiguration object that most recently reported the successful result; and
after the device reboot, cause the autoconfiguration object that most recently reported the successful result to initiate its protocol testing process.

8. A smart communications controller for building equipment, the smart communications controller comprising:
an equipment port connected to the building equipment; and
a processing circuit configured to perform a protocol testing process comprising selecting a protocol identification technique based on whether a tested communications protocol supports sending a request for an equipment ID to the building equipment and wherein the protocol identification technique comprises:
receiving a message from the building equipment, the message comprising a plurality of equipment attributes;
comparing the plurality of equipment attributes to a set of protocol-specific equipment attribute mappings, each protocol-specific attribute mapping corresponding to a different communications protocol;
if the plurality of equipment attributes match the protocol-specific attribute mapping corresponding to the communications protocol, identifying a communications protocol used by the building equipment and reporting a successful result of the protocol testing process; and
if the plurality of equipment attributes do not match any of the protocol-specific attribute mappings, reporting an unsuccessful result of the protocol testing process;
the processing circuit comprising an equipment controller configured to use the identified communications protocol to generate protocol-specific control signals for the building equipment and operate the building equipment to affect a variable state or condition within a building.

9. The smart communications controller of claim 8, wherein:
the processing circuit is configured to perform an equipment identification process after the communications protocol used by the building equipment is identified; and
the equipment identification process uses the identified communications protocol to identify the building equipment connected to the equipment port.

10. The smart communications controller of claim 9, the processing circuit further comprising an equipment model manager configured to use an identity of the building equipment determined by the equipment identification process to select an equipment model for the building equipment.

11. The smart communications controller of claim 8, the processing circuit comprising a plurality of autoconfiguration objects, each of the autoconfiguration objects corresponding to a different communications protocol and configured to perform the protocol testing process for the corresponding communications protocol.

12. The smart communications controller of claim 11, the processing circuit comprising an autoconfiguration manager configured to cause the autoconfiguration objects to iteratively perform their protocol testing processes until the communications protocol used by the building equipment is identified.

13. The smart communications controller of claim 12, wherein:
each of the plurality of autoconfiguration objects is configured to report a result of the protocol testing process to the autoconfiguration manager;
the autoconfiguration manager is configured to terminate a first protocol testing process performed by a first autoconfiguration object in response to the first autoconfiguration object reporting a successful result of the first protocol testing process; and the autoconfiguration manager is configured to cause a second autoconfiguration object to initiate a second protocol testing process in response to the first autoconfiguration object reporting an unsuccessful result of the first protocol testing process.

14. The smart communications controller of claim 12, wherein the autoconfiguration manager is configured to:

maintain a list of the autoconfiguration objects;

determine whether a currently-active autoconfiguration object is a last autoconfiguration object in the list;

if the currently-active autoconfiguration object is not the last autoconfiguration object in the list, cause a next autoconfiguration object in the list to initiate a next protocol testing process in response to the currently-active autoconfiguration object reporting an unsuccessful result of the protocol testing process; and if the currently-active autoconfiguration object is the last autoconfiguration object in the list, cause a first autoconfiguration object in the list to initiate a first protocol testing process in response to the currently-active autoconfiguration object reporting the unsuccessful result of the protocol testing process.

15. The smart communications controller of claim 12, wherein the autoconfiguration manager is configured to:

determine which of the autoconfiguration objects most recently reported a successful result of the protocol testing process;

prior to a device reboot, store an indication of the autoconfiguration object that most recently reported the successful result; and after the device reboot, cause the autoconfiguration object that most recently reported the successful result to initiate its protocol testing process.

16. A method for interacting with building equipment, the method comprising:

identifying a plurality of autoconfiguration objects, each of the autoconfiguration objects corresponding to a different communications protocol;

causing each autoconfiguration object of the plurality of autoconfiguration objects to perform a protocol testing process comprising:

determining whether the communications protocol corresponding to the autoconfiguration object supports sending a request for an equipment ID to the building equipment;

selecting a protocol identification technique based on whether the corresponding communications protocol supports sending the request for the equipment ID to the building equipment; and using the selected protocol identification technique to automatically determine whether the corresponding communications protocol is used by the building equipment;

causing the autoconfiguration objects to iteratively perform their protocol testing processes until the communications protocol used by the building equipment is identified; and using the identified communications protocol for the building equipment to generate protocol-specific control signals for the building equipment and to operate the building equipment to affect a variable state or condition within a building.

17. The method of claim 16, further comprising performing an equipment identification process after the communications protocol used by the building equipment is identified;

wherein performing the equipment identification process comprises using the identified communications protocol to identify the building equipment.

18. The method of claim 17, further comprising using an identity of the building equipment determined by performing the equipment identification process to select an equipment model for the building equipment.

19. The method of claim 16, wherein in response to a determination that the corresponding communications protocol supports sending the request for the equipment ID to the building equipment, the protocol testing process comprises:

sending a request message to the building equipment using the corresponding communications protocol, the request message comprising the request for the equipment ID;

receiving a response message from the building equipment in response to the request message; and identifying the corresponding communications protocol as being used by the building equipment in response to the response message including the requested equipment ID.

20. The method of claim 16, wherein in response to a determination that the corresponding communications protocol does not support sending the request for the equipment ID to the building equipment, the protocol testing process comprises:

receiving a message from the building equipment, the message comprising a plurality of equipment attributes;

comparing the plurality of equipment attributes to a set of protocol-specific equipment attribute mappings, each protocol-specific attribute mapping corresponding to a different communications protocol; and identifying a communications protocol used by the building equipment in response to the plurality of equipment attributes matching the protocol-specific attribute mapping corresponding to the communications protocol.

* * * * *